United States Patent
Prajapati et al.

(10) Patent No.: US 12,026,149 B2
(45) Date of Patent: Jul. 2, 2024

(54) APPARATUSES, COMPUTER-IMPLEMENTED METHODS, AND COMPUTER PROGRAM PRODUCTS FOR FACILITATING COMPUTER-BASED TRANSFER OF TRANSFERABLE DATA OBJECTS

(71) Applicant: ALKMY Technologies, LLC, Beverly Hills, CA (US)

(72) Inventors: Sanjaykumar Prajapati, Beverly Hills, CA (US); John Lee Tso, Beverly Hills, CA (US); Daniel S. Pancotto, Beverly Hills, CA (US)

(73) Assignee: Alkmy Technologies, LLC, Beverly Hills, CA (US)

( * ) Notice: Subject to any disclaimer, the term of this patent is extended or adjusted under 35 U.S.C. 154(b) by 8 days.

(21) Appl. No.: 17/220,685

(22) Filed: Apr. 1, 2021

(65) Prior Publication Data

US 2021/0311931 A1    Oct. 7, 2021

Related U.S. Application Data

(60) Provisional application No. 63/004,372, filed on Apr. 2, 2020.

(51) Int. Cl.
*G06F 16/2458*    (2019.01)
*G06F 16/22*    (2019.01)
(Continued)

(52) U.S. Cl.
CPC ...... *G06F 16/2379* (2019.01); *G06F 16/2282* (2019.01); *G06F 16/24578* (2019.01); *G06F 16/2458* (2019.01); *G06F 16/289* (2019.01)

(58) Field of Classification Search
CPC ............... G06F 16/2379; G06F 16/289; G06F 16/2458; G06F 16/2282; G06F 16/24578
(Continued)

(56) References Cited

U.S. PATENT DOCUMENTS

2008/0103987 A1    5/2008   Bocheck
2009/0119223 A1    5/2009   Ourega
(Continued)

FOREIGN PATENT DOCUMENTS

JP    2017-10100 A    1/2017
KR    10-2012-0069989    6/2012

OTHER PUBLICATIONS

PCT/US2021/025445 International Search Report and Written Opinion mailed Jul. 2, 2021.

(Continued)

*Primary Examiner* — Mark E Hershley
*Assistant Examiner* — Antonio J Caiado
(74) *Attorney, Agent, or Firm* — Alston & Bird LLP

(57) ABSTRACT

Embodiments of the present disclosure provide computer systems, computer apparatuses, computer methods, and computer program products for generating optimized transfers of the transferable data objects. Such transfers may involve any number of distinct users and objects associated therewith. Preferred transfer(s) of transferable data objects may be identified such that the transfers satisfy the preference associations of all associated users, and/or based on particular criteria to be satisfied, maximized, or minimized.

20 Claims, 11 Drawing Sheets

(51) Int. Cl.
*G06F 16/23* (2019.01)
*G06F 16/2457* (2019.01)
*G06F 16/28* (2019.01)

(58) Field of Classification Search
USPC .......................................................... 707/703
See application file for complete search history.

(56) References Cited

U.S. PATENT DOCUMENTS

| | | | | |
|---|---|---|---|---|
| 2009/0177744 | A1* | 7/2009 | Marlow | G06Q 10/10 709/204 |
| 2010/0293108 | A1* | 11/2010 | Gurvitch | G06Q 40/04 705/37 |
| 2011/0196797 | A1* | 8/2011 | Liwerant | G06Q 50/188 705/71 |
| 2013/0036165 | A1* | 2/2013 | Tseng | G06Q 30/0224 709/204 |
| 2015/0154694 | A1 | 6/2015 | Vorse | |
| 2016/0063003 | A1* | 3/2016 | Tseng | G06F 16/29 707/724 |
| 2017/0323299 | A1* | 11/2017 | Davis | G06Q 20/204 |
| 2018/0074910 | A1* | 3/2018 | Hammer | G06F 11/1451 |
| 2020/0110728 | A1* | 4/2020 | Semenov | G06F 16/183 |
| 2020/0160368 | A1* | 5/2020 | Miller | G06Q 20/351 |
| 2020/0250143 | A1* | 8/2020 | Ball | G06F 16/1748 |
| 2020/0320129 | A1* | 10/2020 | Korpman | G06F 9/541 |
| 2021/0217043 | A1* | 7/2021 | Sharma | G06Q 30/0227 |

OTHER PUBLICATIONS

Shorman, et al., "Developing The E-Commerce Model a Consumer to Consumer Using Blockchain Network Technique," International Journal of Managing Information Technology, vol. 11, No. 2, pp. 55-64, (May 31, 2019).
PCT/US2021/025445 Second Written Opinion of the International Preliminary Authority mailed Feb. 7, 2022.

* cited by examiner

APPARATUSES, COMPUTER-IMPLEMENTED METHODS, AND COMPUTER PROGRAM PRODUCTS FOR FACILITATING COMPUTER-BASED TRANSFER OF TRANSFERABLE DATA OBJECTS

CROSS-REFERENCE TO RELATED APPLICATIONS

This application claims priority to U.S. Provisional Application No. 63/004,372 filed Apr. 2, 2020, entitled "PROCESS AND METHOD FOR PROVIDING A COMPUTER-BASED PLATFORM FACILITATING A TRADE OF GOODS," the contents of which are incorporated by reference herein in their entirety.

TECHNICAL FIELD

Embodiments of the present disclosure generally relate to facilitating one or more transfer(s), and specifically to generating preferred transfer(s) of transferable data object(s) for any number of user(s) and facilitating such transfer(s).

BACKGROUND

In general, systems facilitating transfers between user(s) (e.g., computer-based consumer-to-consumer (C2C) marketplaces) fail to provide a direct transfer of object(s), or require unnecessary and extraneous time, input, and efforts by users to facilitate any transfers. Such systems often lack proper means for ensuring that computing resources are allocated only towards available transferable data objects, and properly updating statuses for such transferable data objects as actions associated with the transferable data objects are performed.

The inventors have identified the above and other technical problems with the operations of existing systems related to facilitating transfer of transferable data object(s). Through applied effort, ingenuity, and innovation, many of these identified problems have been solved by developing solutions that are included in embodiments of the present invention, many examples of which are described in detail herein.

BRIEF SUMMARY

In general, embodiments of the present disclosure provided herein are directed to computer-implemented methods, systems, apparatuses, and computer program products for generating and/or facilitating computer-driven transfer(s) of transferable data objects. Other implementations for generating and/or facilitating computer-driven transfer(s) of transferable data objects will be, or will become, apparent to one with skill in the art upon examination of the following figures and detailed description. It is intended that all such implementations be included with this description and disclosure, and be protected within the scope of the following claims.

Embodiments of the present disclosure include apparatus(es) configured to perform computer-implemented methods. In some embodiments, the apparatus comprises at least one processor, and at least one memory associated with the at least one processor having computer coded instructions therein, with the computer coded instructions configured to, when executed by the processor, configures the apparatus to perform any one or more of the computer-implemented method(s) described herein. Embodiments of the present disclosure further include computer program product(s) configured for performing computer-implemented methods. In some embodiments, the computer program product comprises at least one non-transitory computer-readable storage medium that, when executed by at least one processor, configures the at least one processor for performing any one or more of the computer-implemented method(s) described herein.

In accordance with a first aspect of the present disclosure, a computer-implemented method is provided. The computer-implemented method may be performed via any of the computing devices described herein, for example embodied in hardware, software, firmware, and/or any combination thereof as described herein. In an example implementation of the computer-implemented method, the computer-implemented method includes receiving user input data indicating a first preference stored in association with a first target data object interchangeable between user profiles. The example computer-implemented method further includes generating a first entry in a preference association table, the first entry embodying the first preference association. The example computer-implemented method further includes identifying at least one user-associated data object associated with the first user profile identifier. The example computer-implemented method further includes identifying one or more transfers of the at least one target data object and at least one available data object that satisfies the first preference association associated with the first user profile identifier. The example computer-implemented method further includes automatically programmatically selecting a preferred at least one transfer of the one or more transfers. The example computer-implemented method further includes generating at least one entry in a transfers table, the at least one entry representing the preferred at least one transfer. The example computer-implemented method further includes providing one or more transfer request notices for at least the first user profile identifier and at least one other user profile identifier associated with the preferred one or more transfers. The example computer-implemented method further includes receiving transfer initiation response data associated with the first user profile identifier, the at least one other user profile identifier, or a combination thereof. The example computer-implemented method further includes processing the transfer initiation response data.

In some example embodiments of the computer-implemented method, identifying the at least one transferable data object associated with the first user profile identifier includes iterating through a transferable data object list associated with the first user profile, and where, for each transferable data object in the transferable data object list, the computer-implemented method includes attempting to generate a transfer that includes the transferable data object to satisfy a second preference association of a second user profile associated with the transfer, the second user profile associated with a second user profile identifier indicated as recipient user profile for the transfer.

In some example embodiments of the computer-implemented method, identifying the at least one transfer of at least one available transferable data object that satisfies the first preference association associated with the first user profile identifier includes identifying an available transferable data object that satisfies the preference association, wherein the available transferable data object is associated with a second user profile identifier, wherein the transfer of the at least one transferable data object associated with the first user profile identifier satisfies a second preference association of the second user profile identifier.

In some example embodiments of the computer-implemented method, identifying the at least one transfer of at least one available transferable data object that satisfies the first preference association associated with the first user profile identifier includes determining that no transfer of an available transferable data object satisfies the preference association by attempting to identify an available transferable data object that satisfies the preference association; and identifying a plurality of transfers that embody a multi-way transfer between the first user profile identifier and a plurality of other user profile identifiers, wherein the plurality of transfers satisfy the first preference association and an additional preference association for each of the plurality of other user profile identifiers.

Additionally or alternatively, in some such embodiments of the example computer-implemented method, identifying the plurality of transfers associated with the first user profile identifier and the plurality of other user profile identifiers includes incrementing a number of transfers to identify; and attempting to identify the plurality of transfers comprising the number of transfers, wherein the number of transfers is further incremented in a circumstance where the plurality of transfers comprising the number of transfers is determined not to satisfy the first preference association.

In some example embodiments of the computer-implemented method, selecting the preferred at least one transfer of the one or more transfers includes generating, utilizing a transfer optimization model, transfer preference ranking data for each transfer of the at least one transfer; and selecting the preferred one or more transfers based at least in part on the transfer preference ranking data.

Additionally or alternatively, in some such example embodiments of the computer-implemented method, the transfer optimization model generates the transfer preference ranking data based at least in part on at least one of: transfer object detail data; object resource value data; user preference data; object comparison data; object domain data; object transferability data; object search data; historical transfer data; user history data; user activity data; and locality data.

In some example embodiments of the computer-implemented method, generating the at least one entry in a transfers table, includes generating an entry in the transfer table for each preferred transfer of the preferred one or more transfers, wherein each entry for the preferred one or more transfers is linked with at least one shared transfer identifier.

In some example embodiments of the computer-implemented method, processing the transfer initiation response data includes determining the transfer initiation response data comprises an acceptance data object associated with each of the preferred one or more transfer; and updating the at least one entry in the transfers table to indicate acceptance of the preferred one or more transfer.

In some example embodiments of the computer-implemented method, processing the transfer initiation response data includes determining the transfer initiation response data comprises at least one declining data object associated with the first user profile identifier or one or more of the at least one other user profile; and providing a transfer declination notice for each remaining user profile identifiers associated with the preferred one or more transfers.

In some example embodiments of the computer-implemented method processing the transfer initiation response data includes determining the transfer initiation response data comprises at least one declining data object associated with a particular preferred transfer of the preferred one or more transfers, the particular preferred transfer associated with a first transferable data object and a second transferable data object; identifying one or more alternative preferred transfers for the first transferable data object and the second transferable data object; generating at least one updated entry in the transfers table, the at least one entry representing the one or more alternative preferred transfers; and providing one or more additional transfer request notice for each user profile associated with one or more alternative preferred transfers.

In some example embodiments of the computer-implemented method, processing the transfer initiation response data includes determining the transfer initiation response data comprises at least one declining data object associated with a particular preferred transfer of the preferred one or more transfers; identifying one or more alternative preferred transfers to replace the particular preferred transfer, wherein the one or more alternative preferred transfers satisfy a second preference association for each user profile identifier associated with the one or more alternative preferred transfers; generating at least one updated entry in the transfers table, the at least one entry representing the one or more alternative preferred transfers; and provide one or more alternative transfer request notice for each user profile identifier associated with one or more alternative preferred transfers.

In some example embodiments of the computer-implemented method, selecting the preferred one or more transfers of the at least one transfer includes for each transfer of the at least one transfer, automatically programmatically generating object resource value data for each transferable data object associated with the transfer; and selecting the preferred one or more transfers that minimize a resource differential between the object resource value data for each transferable data object associated with the transfer.

In some example embodiments of the computer-implemented method, automatically programmatically generating object resource value data for each transferable data object associated with the transfer includes identifying API-generated resource value data for the transferable object utilizing an object resource value generating API based at least in part on transferable data object detail data corresponding to the transferable data object; determining the transferable data is identified via the object resource value generating API; parsing the API-generated resource value data to identify the object resource value data for the transferable data object; and associating the object resource value data represented by the API-generated resource value data with the transferable data object.

In some example embodiments of the computer-implemented method, automatically programmatically generating object resource value data for each transferable data object associated with the transfer attempting to identify API-generated resource value data for the transferable object utilizing an object resource value generating API based at least in part on transferable data object detail data corresponding to the transferable data object; determining the transferable data is not identified via the object resource value generating API; accessing a data object blockchain to validate user-inputted object resource value data corresponding to the transferable data object; determining validity of the user-inputted object resource value data based on blockchain data identified from the data object blockchain; and associating the object resource value data generated based on the validity of the user-inputted object resource value data and the blockchain data.

In accordance with a second aspect of the present disclosure, an apparatus is provided. In a first example embodiment of the apparatus in accordance with the present disclosure, the apparatus includes at least one processor and at least one memory having computer-coded instructions stored thereon. The computer-coded instructions, in execution with the at least one processor, configure the apparatus to perform any one of the example computer-implemented methods described herein. In a second example embodiment of the apparatus in accordance with the present disclosure, the apparatus includes means for performing each step of any one of the example computer-implemented methods described herein.

In accordance with a third aspect of the present disclosure, a computer program product is provided. In a first example embodiment of the computer program product in accordance with the present disclosure, the computer program product includes at least one non-transitory computer-readable storage medium having computer program code stored thereon. The computer program code is configured to, in execution with at least one processor, cause the computer program product to perform any one of the computer-implemented methods described herein.

BRIEF DESCRIPTION OF THE DRAWINGS

Having thus described the invention in general terms, reference will now be made to the accompanying drawings, which are not necessarily drawn to scale.

Figure 1:
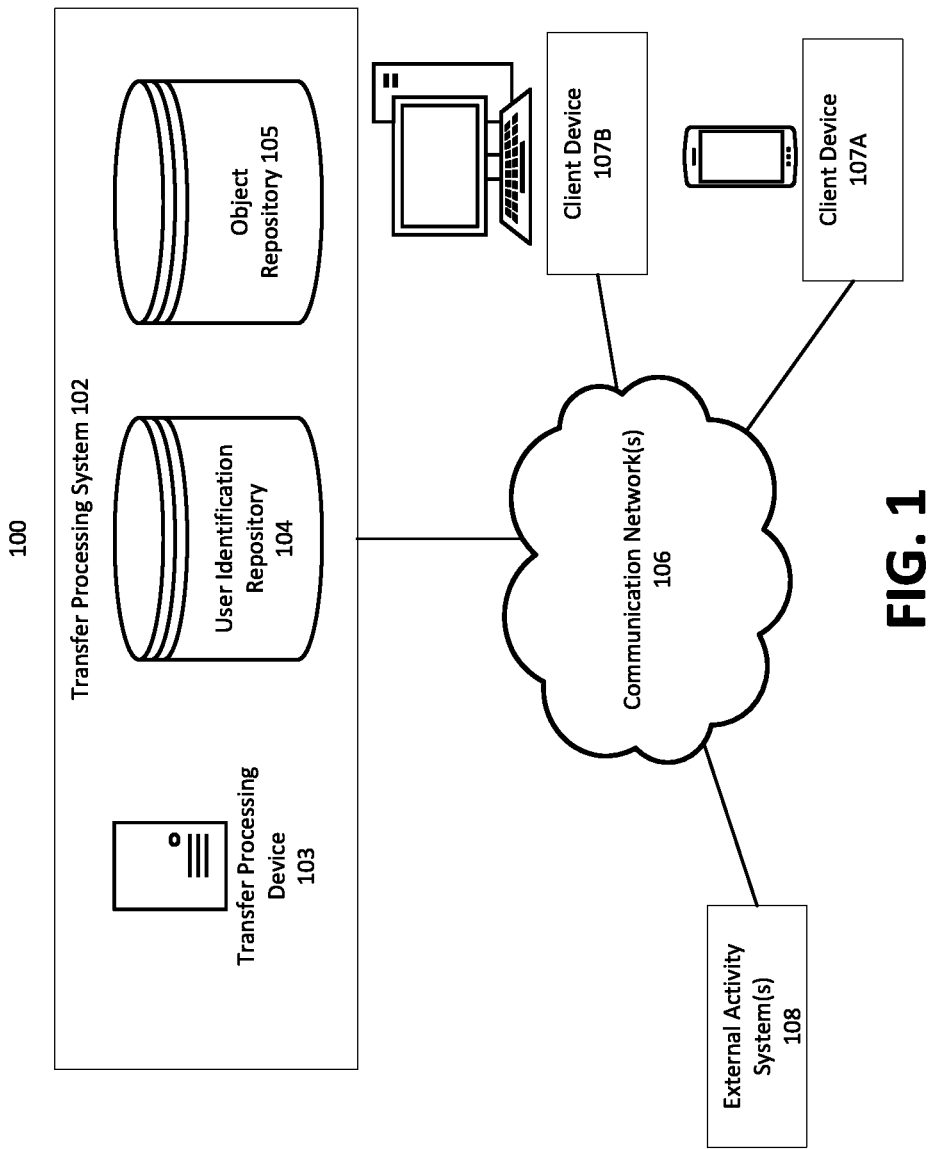
Figure 2:
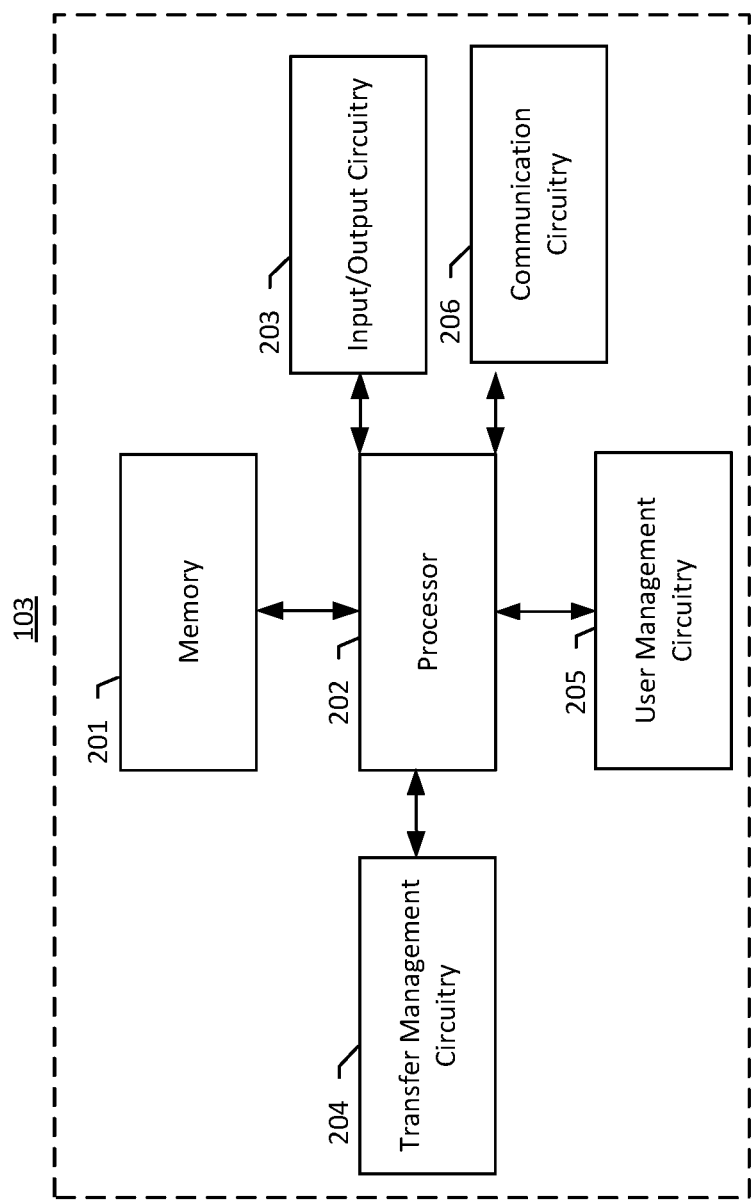
Figure 3:
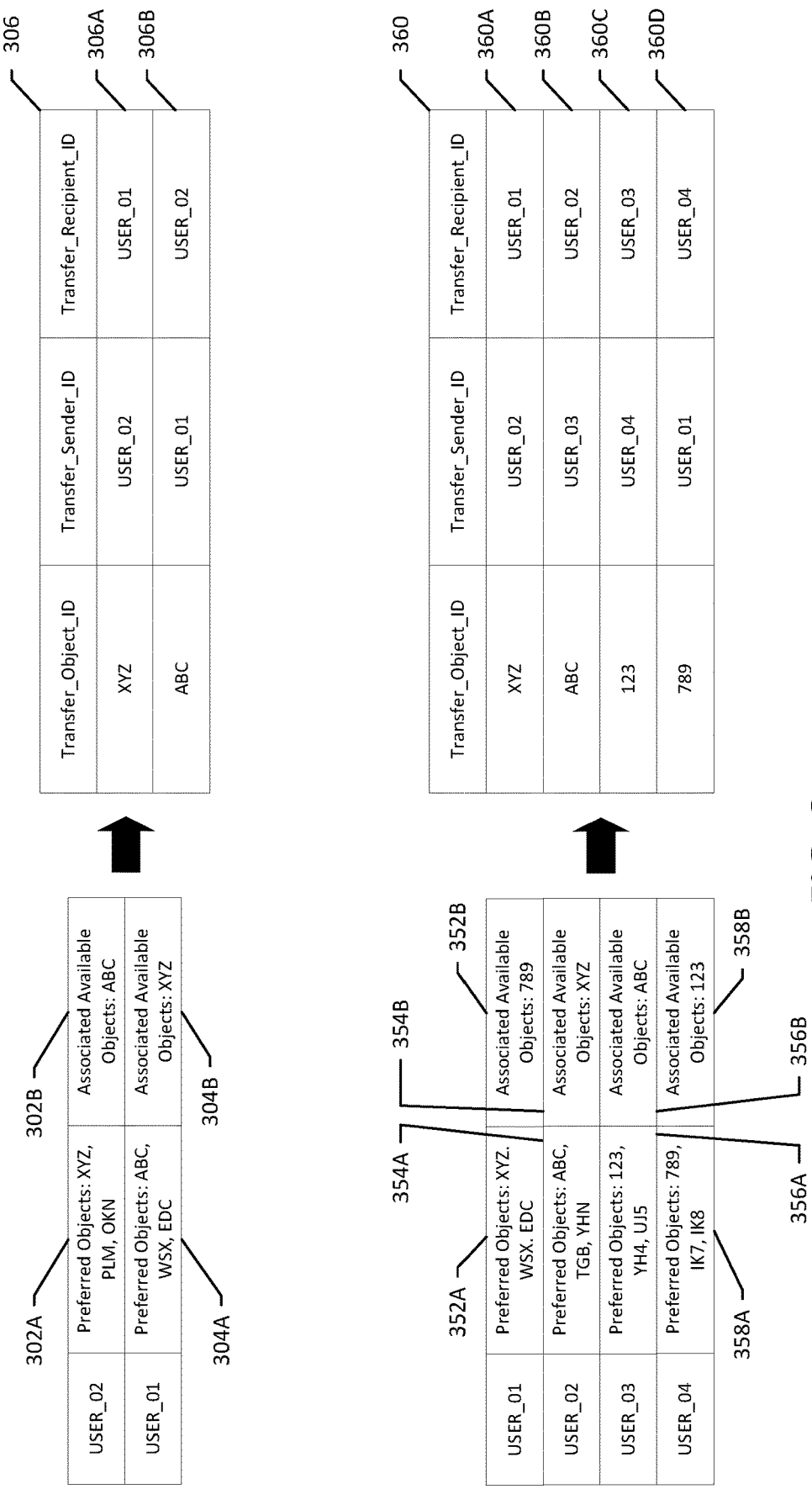
Figure 4:
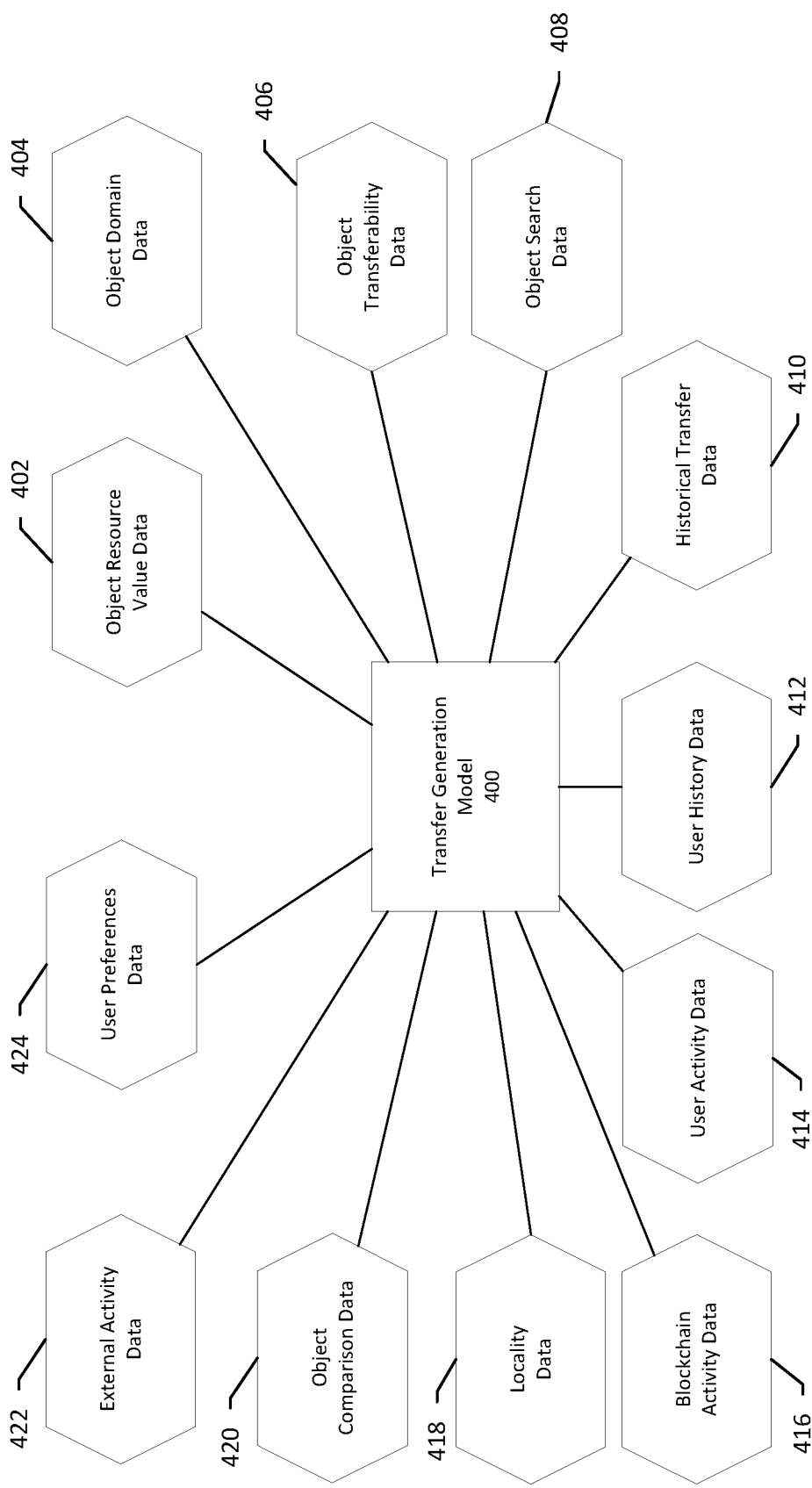
Figure 5:
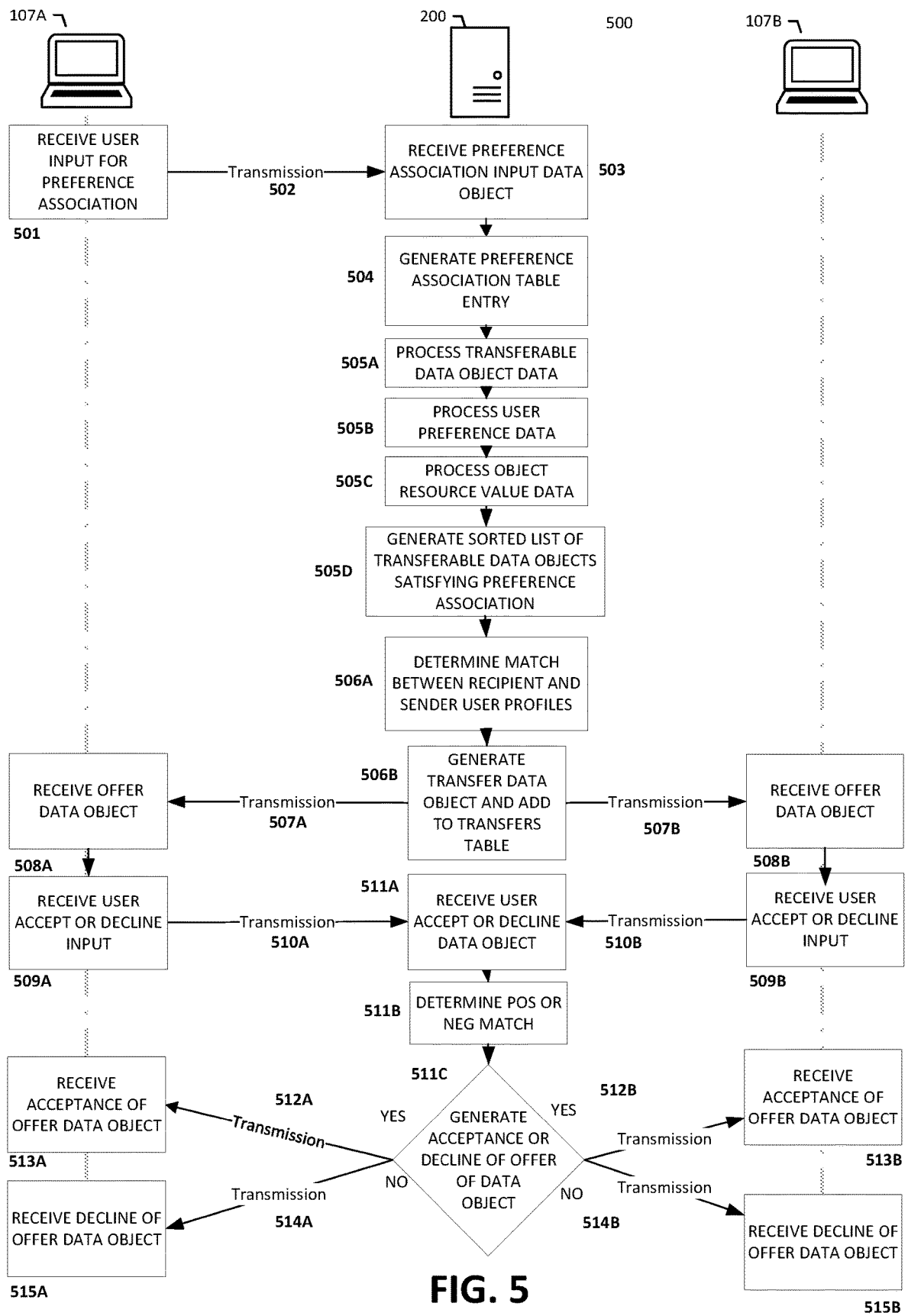
Figure 6:
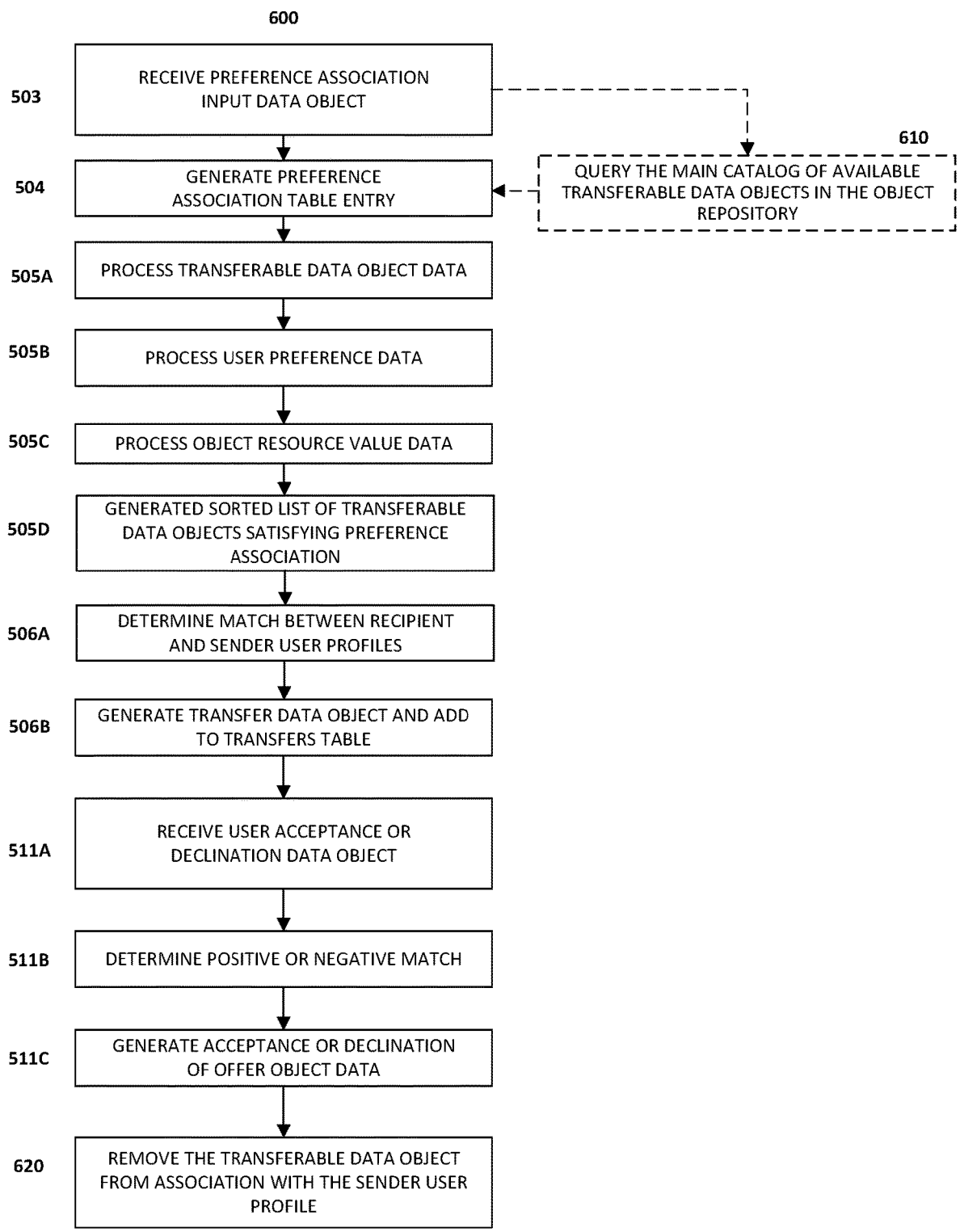
Figure 7:
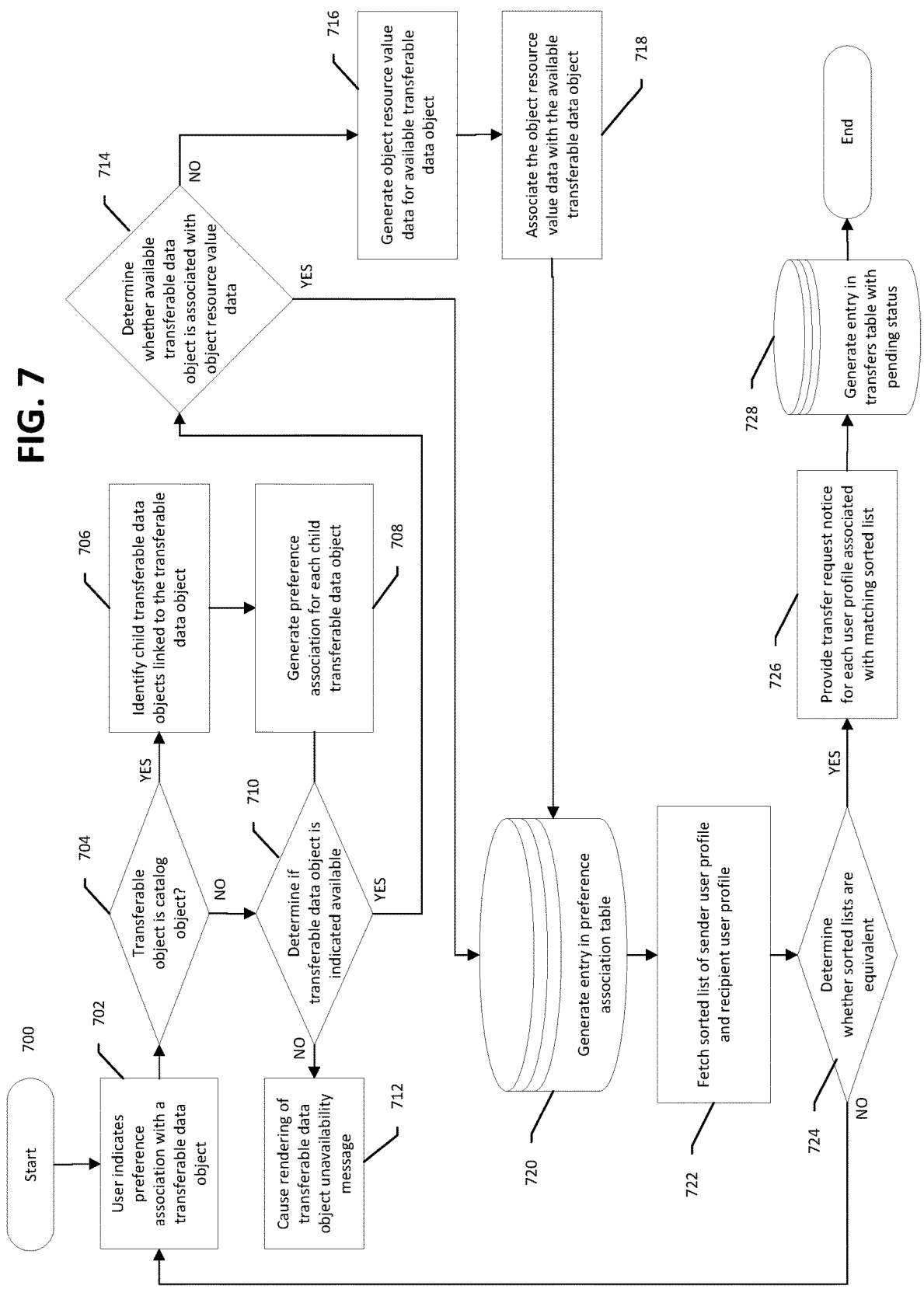
Figure 8:
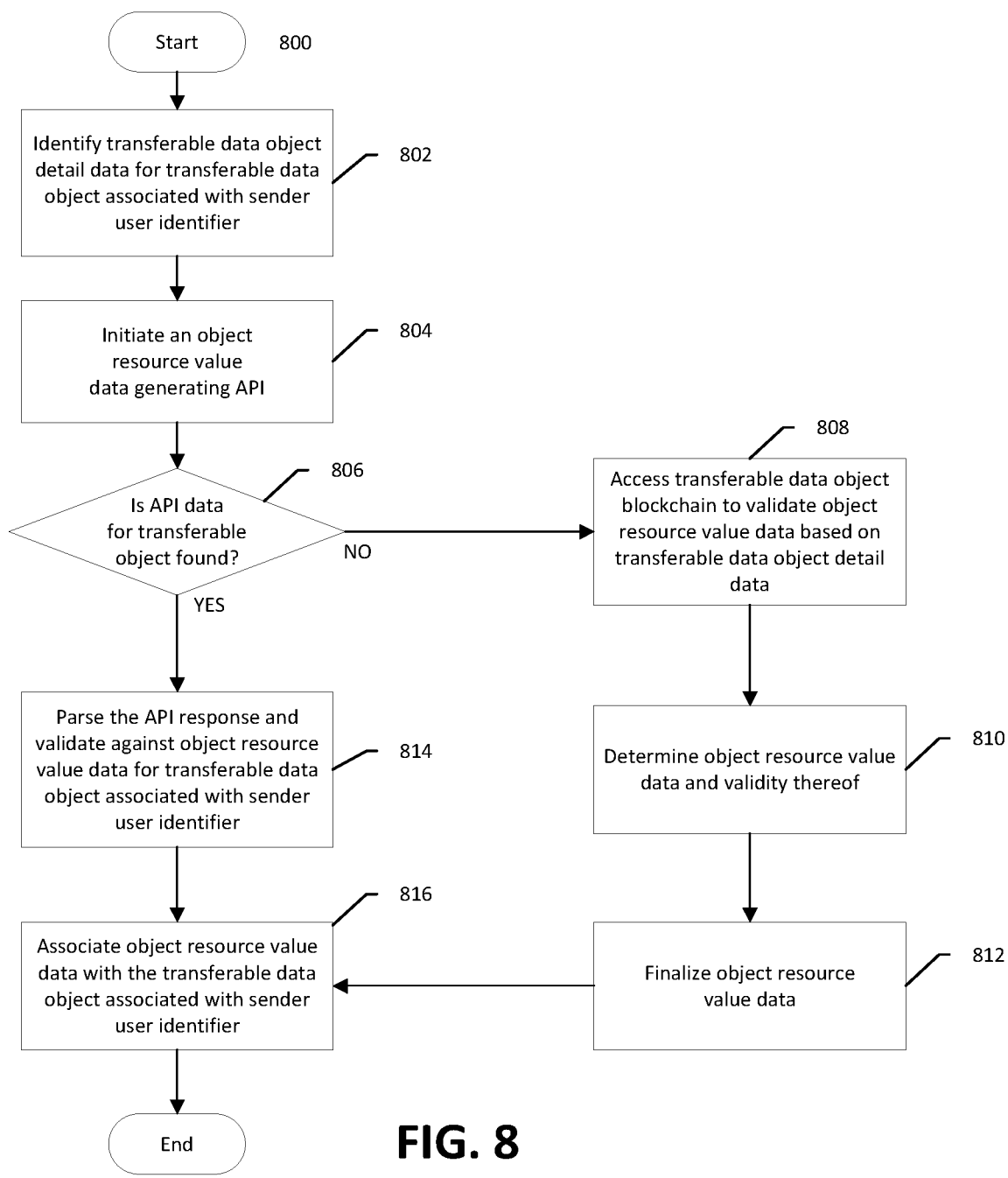
Figure 9:
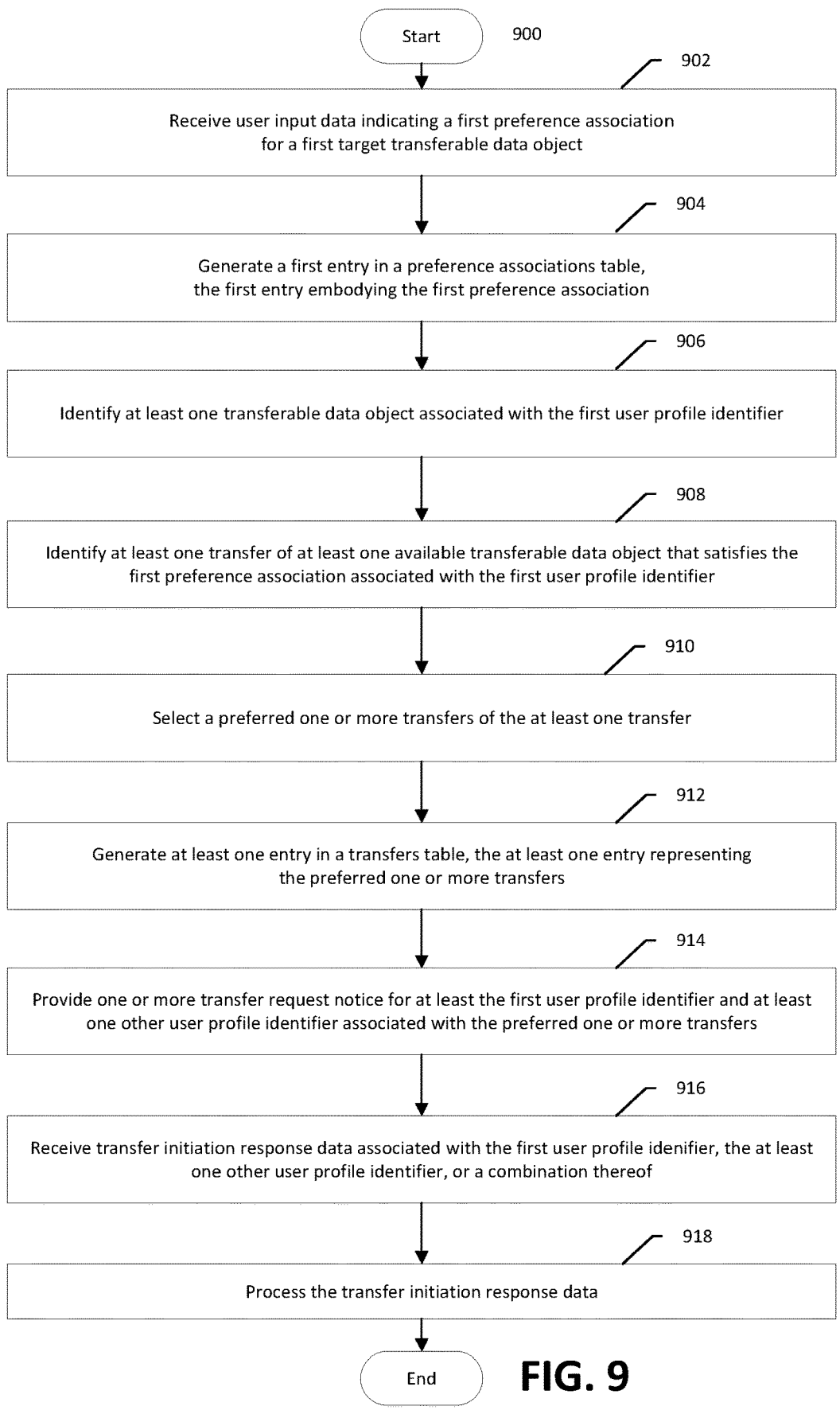
Figure 10:
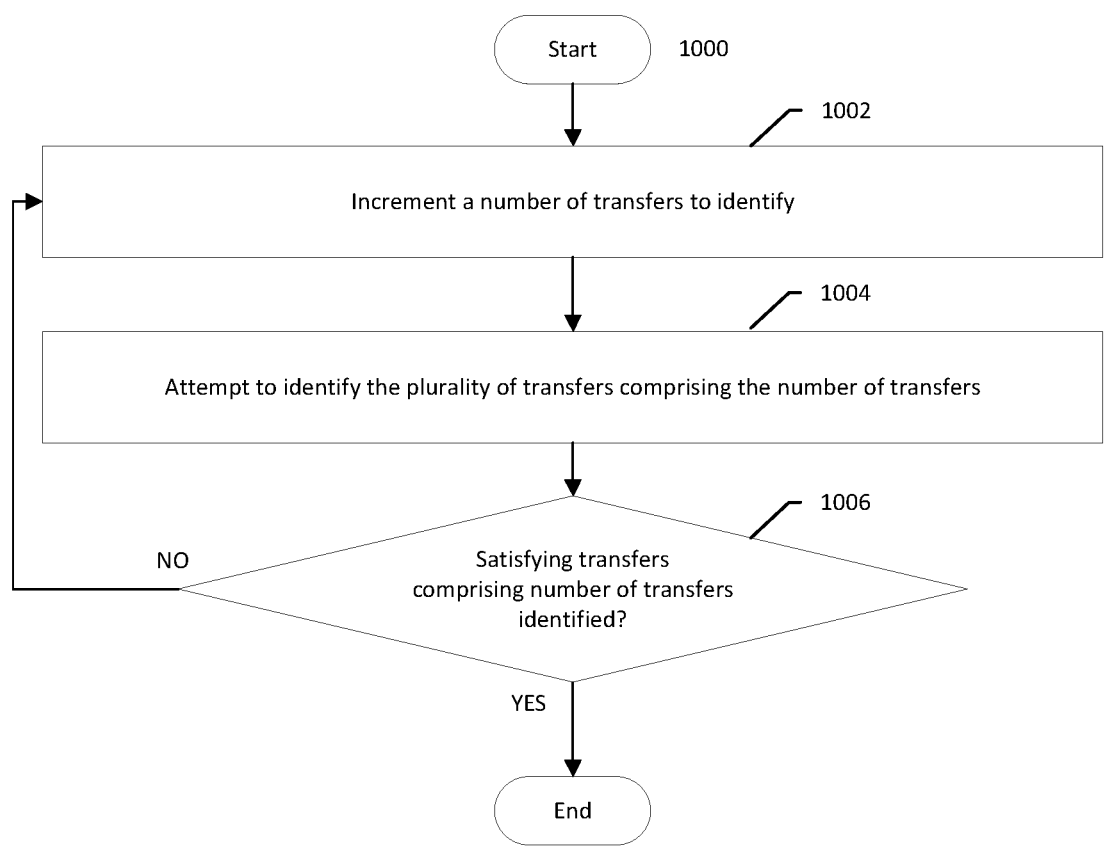
Figure 11:
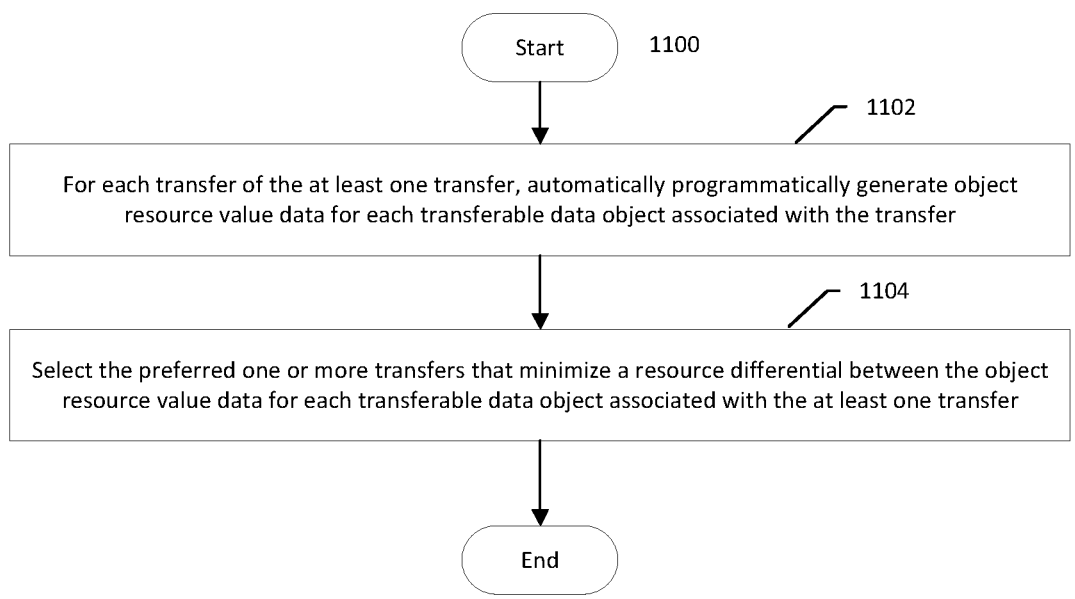

FIG. 1 illustrates an exemplary system for generating and/or facilitating preferred transfer(s), according to at least some embodiments of the present disclosure;

FIG. 2 illustrates an exemplary transfer processing apparatus in accordance with at least some embodiments of the present disclosure;

FIG. 3 illustrates example data representations of a computing environment in accordance with at least some embodiments of the present disclosure;

FIG. 4 illustrates example data representations contributing to one or more transfer generation model(s) in accordance with at least some embodiments of the present disclosure;

FIG. 5 illustrates an example data flow attributable to generating at least one preferred transfer in accordance with at least some embodiments of the present disclosure;

FIG. 6 illustrates a flowchart illustrating exemplary operations of a computer-implemented process for generating and/or facilitating preferred transfer(s) in accordance with at least some example embodiments of the present disclosure;

FIG. 7 illustrates a flowchart depicting example operations of a computer-implemented process for generating and/or facilitating preferred transfer(s) in accordance with at least some example embodiments of the present disclosure;

FIG. 8 illustrates a flowchart depicting example operations of a computer-implemented process for associating object resource value data to a transferable data object in accordance with at least some example embodiments of the present disclosure;

FIG. 9 illustrates a flowchart depicting example operations of another computer-implemented process for generating and/or facilitating preferred transfer(s) in accordance with at least some example embodiments of the present disclosure;

FIG. 10 illustrates a flowchart depicting example operations of another computer-implemented process for generating and/or facilitating preferred transfer(s) in accordance with at least some example embodiments of the present disclosure; and FIG. 11 illustrates a flowchart depicting example operations of another computer-implemented process for generating and/or facilitating preferred transfer(s) in accordance with at least some example embodiments of the present disclosure.

DETAILED DESCRIPTION

Various embodiments of the disclosure now will be described more fully hereinafter, in which some, but not all embodiments of the disclosures are shown. Indeed, the embodiments of the disclosure may be embodied in many different forms and should not be construed as limited to the embodiments set forth herein; rather, these embodiments are provided so that this disclosure will satisfy applicable legal requirements. Like numbers refer to like elements throughout. The term "or" is used herein in both the alternative and conjunctive sense, unless otherwise indicated. The terms "illustrative" and "exemplary" are used to be examples with no indication of quality level.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Definitions

The term "user profile identifier" refers to one or more unique numeric, alphanumeric, symbol, or other data representations that uniquely identify a particular user profile corresponding to a user of a transfer processing system. In some embodiments, a user registers a user profile via associated user authentication credentials, for example a username and password, that enable access to the system via the particular user profile. Each registered user profile is uniquely identified by a corresponding user profile identifier. Non-limiting examples include a randomly generated alphanumeric string, a unique username, and/or the like.

The term "client" refers to an end user accessing functionality of a particular system, for example a transfer processing system as described herein. The term "client"

device" refers to one or more computing devices embodied in hardware, software, firmware, and/or a combination thereof, that is utilized by a particular client for accessing functionality of one or more particular systems. Non-limiting examples of a client device include a user's mobile device, smartphone, tablet, laptop, desktop, smart home device, Internet-of-things (IOT) enabled device, wearable, enterprise terminal, and/or fixed computing terminal (e.g., a kiosk).

The term "user preference data" refers to electronically managed data that indicates particular one or more data value(s) for data properties preferred by a particular user profile.

The term "user history data" refers to electronically managed data representing interactions by a particular user profile associated with generating and/or facilitating transfer(s) of transferable data object(s). Non-limiting examples of user history data includes previously accepted, rejected, and/or received transfers, previously owned transferable data objects, previous object query information, and/or data for other initiated action(s) by a user profile.

The term "user activity data" refers to electronically managed data indicating a level of interaction performed by a user profile for generating and/or facilitating transfer(s) of transferable data objects. In some embodiments, user activity data represents a number of transfers accepted by a particular user profile, a number of transfers completed by a particular user profile, a number of transferable data objects transferred by a particular user profile, and/or a derived metric representing a user profile's level of interaction for generating and/or facilitating transfer(s) of transferable data object(s).

The term "locality data" refers to electronically managed data representing or associated with a geographic location for a particular user profile. In a circumstance where utilized with respect to two or more user profiles, locality data refers to a stored and/or determined distance metric representing the difference between locality data for each user profile. Non-limiting examples of locality data comprises a street address, GPS coordinate, latitude and/or longitude data, zip code, and localized position data. In some embodiments, locality data is automatically determined, for example, as a non-limiting list of examples, based at least in part on IP address information for a particular computing device, location services data for the particular computing device, GPS data for a particular computing device, and by triangulation by a particular computing device. In other embodiments, locality data is manually inputted, for example, as a non-limiting list of examples, based at least in part on user input representing the locality data.

The term "transferable data object" refers to electronically managed data objects made available for transfer between user profiles. Transferable data objects may reflect data objects that correspond with physical object(s) that may be transferred along with a data object. For example, a transferable data object may be a digital representation of a physical object made available for transfer between user profiles, and/or an electronically managed embodiment of a virtual object, that are transferable between users associated with particular user profile(s) via a transfer processing system. Non-limiting examples of a transferable data object include a real-world product, collectible, item, commodity, furniture, and/or other property, and/or virtual item, virtual collectible, virtual data, virtual commodity, in-game item, a non-fungible token (NFT), and/or other virtual property.

The term "transfer object detail data" refers to electronically managed data value(s) corresponding to one or more data properties of a data object embodying a particular transferable data object. Non-limiting examples of transfer object detail data includes one or more data value(s) for relevant characteristics of a transferable data object, identifying information for the transferable data object, owner information for the transferable data object, and/or the like.

The term "object comparison data" refers to electronically managed data representing determined similarities and/or differences, and/or derived levels of similarity and/or difference, between two or more transferable data objects. For example, non-limiting examples of object comparison data includes data indicating whether two objects are similar based on one or a combination of metrics, such as based on transfer object detail data, and data indicating whether certain data properties of two or more transferable data objects are the same or similar within a particular domain. The object comparison data may be determined based at least in part on data properties of the transferable data object and/or associated with the transferable data object, such as similarities in alphanumeric data stored within portions of the transferable data object (e.g., such similarities may be identified via algorithms, such as matching algorithms, machine-learning based models for detecting similarities, and/or the like). The determined similarities between transferable data objects may represent similarities between physical and/or data-driven attributes of one or more corresponding items. In one example context, object comparison data indicates two transferable data objects are similar in circumstances where object resource value data for each of the two transferable data objects is an exact match or which satisfies a particular resource differential tolerance/threshold. In another example context, two transferable data objects are similar in circumstances where the transferable data objects are associated with or include data representing one or more similar physical properties shared by items corresponding to the two transferable data objects.

The term "object domain data" refers to electronically managed data representing a particular category, classification, or other domain within which transferable data objects may be grouped based on one or more criteria. In some embodiments, domains with which a transferable data object may be associated are automatically determined or determinable, user inputted, and/or predetermined.

The term "object transferability data" refers to electronically managed data representing, for a particular transferable data object, a likelihood that a transfer associated with the particular transferable data object would be accepted. In certain embodiments, the object transferability data embodies one or more scores and/or values that represent one or more aspects of the transferability of the corresponding transferable data object. In some contexts, the object transferability data is generated or otherwise determined by one or more algorithm(s), artificial intelligence system(s), and/or statistical, algorithmic, and/or machine learning model(s) configured based on one or more particular data inputs, such as historical data associated with one or more transfer(s), user profile data, and/or the like. In some embodiments, object transferability data comprises one or more sub-data portions, for example object rarity data representing the rarity of a particular transferable data object, object popularity data representing a derived or input popularity of a particular transferable object, object desirability data indicating a derived or input desirability of a particular transferable object, and/or object velocity data indicating a derived or input speed at which transfers associated with a particular transferable object are accepted and/or number of transfers including a particular transferable data object.

The term "object search data" refers to electronically managed data representing one or more historical search queries or selections submitted by a particular user profile to search for available transferable data objects that meet criteria of the historical search queries or selections.

The term "historical transfer data" refers to electronically managed data representing historical transfers initiated by, accepted by, rejected by, and/or completed by a particular user profile.

The term "target transferable data object" refers to electronically managed data representing a transferable data object indicated by a particular user profile as liked or otherwise desired for transfer to the user profile from a second, different user profile. In some embodiments, a user associated with a user profile may indicate a particular target transferable data object associated with a particular second user profile, a target transferable data object type, and/or a category of target transferable data object(s) for transfer.

The term "preference association" refers to electronically managed data associated with a particular user profile that indicates a particular target transferable data object or grouping of target transferable data objects that the user profile would like to receive via transfer. Such data embodying a preference association may be processed by one or more automated systems, such as a transfer processing system as described herein, to automatically identify matches between the preference association (e.g., transferable data object(s) indicated as desired or otherwise liked by the user) and available transferable data objects owned by another user profile. In some embodiments, the preference association comprises one or more alphanumeric, alphabetical, or numeric identifiers (e.g., a string or other data type) corresponding to or otherwise embodying metadata and/or detail data for one or more transferable data object(s). For example, in some embodiments, a preference association represents a name, description, data tag, or other criteria that may be satisfied by one or more particular transferable data object(s). In some embodiments, a preference association that is associated with a particular transferable data object for a particular user profile indicates that the user corresponding to the user profile "likes" the transferable data object and would like to receive said transferable data object via transfer.

The term "preference association input data object" refers to electronically generated data provided in response to user input by a particular user corresponding to a user profile that indicates generation of a particular preference association to be associated with the user profile. A preference association input data object is generated by a client device and processed by a transfer processing system to generate the new preference association associated with the user profile.

The term "available transferable data object" refers to transferable data objects associated with a particular user profile and indicated by that user profile as available for transfer. In some embodiments, a transferable data object includes or is associated with a first data property having a value that indicates the user profile associated with transferable data object (e.g., an owner of the transferable data object) and a second data property having a value that indicates whether the transferable data object is available for transfer (e.g., as determined by the associated user profile). A user profile may be associated with any number of transferable data object(s), of which the user profile may indicate some or all of which are available for transfer. It should be appreciated that all available transferable data objects corresponding to a particular user profile may be embodied in a particular object availability repository, or sub-repository, comprising the transferable data objects marked as available for transfer by the user profile associated as owner of such transferable data objects. In this regard, a user profile may transfer any of its available transferable data objects for other transferable data objects, for example the transferable data objects with which a preference association has been established for the user profile. The term "user-associated available transferable data object" from the perspective of a particular user profile refers to available transferable data objects that are associated with that particular user profile. In this regard, transfer(s) may be generated for the particular user profile based on available transferable data objects associated with other user profiles and that satisfy preference associations for the particular user profile, and based on user-associated available transferable data objects that satisfy the preference associations for the other user profiles.

In some embodiments, each available transferable data object is associated with a data object or page embodying a listing of the data object accessible by one or more other user profiles of a transfer processing system. In this regard, a user may search and/or browse for available transferable data object(s) meeting certain criteria and access the associated listing for available transferable data objects yielded as results to such search and/or browse activities. In this regard, it should be appreciated that access details associated with an available transferable data object, and/or user-performed review of information, detail data, and/or the like associated with an available transferable data object, is performable by accessing and/or reviewing the listing associated with said available transferable data object.

The term "transfer" refers to electronically managed shift in access, ownership, and/or possession of one or more transferable data object(s) from a first one or more user profile(s) to a second one or more user profile(s). A transfer may be associated with a physical transfer of possession of a physical object in certain embodiments. In other embodiments, a transfer may be completed entirely within a computer-based environment and/or between multiple computer-based environments. The term "sender user profile" refers to a user profile with which a transferable data object is associated with before and upon initiation of a transfer (e.g., an owner of a transferable data object). The term "recipient user profile" refers to a user profile with which a transferable data object is associated with after completion of a transfer (e.g., a user who liked a transferable data object, or otherwise whose preference association(s) were satisfied by the transferable object). In some embodiments, a transfer includes any number of sub-transfers between various user profiles, for example two sub-transfers in a "two-party" transfer, or three or more sub-transfers in a "multi-party" transfer. Each sub-transfer may be embodied by a particular transfer linked with other transfers embodying the sub-transfers. In some embodiments, the transfer of a data object, for example a transferable data object, corresponds to and/or is followed up by a physical trade of physical objects that correspond to and/or are otherwise represented by the corresponding data object representations.

In some embodiments, a "transfer" includes one or more sub-transfers representing legs of two-or-more-way exchange of transferable data objects "matched" to satisfy all applicable user preferences and/or preference associations for user profiles involved in the transfer. In this regard, the "transfer" may refer to all of the individual legs of the two-or-more-way exchange. For example, a match between two user profiles corresponds to a transfer of two transferable data objects comprising two sub-transfers (e.g., a first sub-transfer for a transfer of a first transferable data object from a first user as a sender to a second user as a recipient, and a second sub-transfer for a transfer of a second transferable data object from the second user as a sender to the first user as a recipient in exchange).

The term "preferred transfer" refers to one or more transfer(s) selected for display and/or offering to one or more user profile(s) based on one or more criteria and/or algorithm results. In some embodiments, one or more preferred transfer(s) are determined and/or otherwise selected to optimize particular criteria associated with the transfer. Non-limiting examples of criteria for selecting preferred transfer(s) include not exceeding a particular number of transfers, minimizing one or more parameter(s) associated with one or more transfer(s), maximizing one or more parameter(s) associated with one or more transfer(s), and/or satisfying another custom derived parameter.

The term "transfer preference ranking data" refers to electronically managed data representing a fit for a particular transfer to meeting one or more desired criteria of one or more transfer(s). Transfer preference ranking data may be represented by one or more value(s), score(s), percentage(s), and/or other data representations that indicate the fit with respect to the desired criteria. For example, the transfer preference ranking data may embody an accuracy measurement with respect to a desired output goal (e.g., accuracy for predicting likelihood a transfer is accepted by all associated user profiles). In some embodiments, transfer preference ranking data is utilized for ranking one or more possible transfer(s) and/or selecting from one or more possible transfer(s).

The term "transfer optimization model" refers to one or more machine learning, algorithmic, and/or statistical models that are trained and/or otherwise configured to generate transfer preference ranking data for one or more possible transfer(s) based on particular criteria. In some embodiments, a transfer optimization model takes as input possible transfer(s) and outputs transfer preference ranking data for each for said possible transfer(s). In some other embodiments, a transfer optimization model takes as input possible transfer(s) and outputs a preferred one or more transfer(s). In some other embodiments, a transfer optimization model takes as input data associated with particular user profile(s) (e.g., preference associations), transferable data objects corresponding to each user profile, and/or available objects to output transfer preference ranking data and/or preferred one or more transfer(s). A "transfer generation model" generates transfer(s) that satisfy preference association(s) of user profiles associated with the transfer, and/or determines preferred transfer(s) for a particular user profile or set of user profiles from a set of generated and/or identified transfer(s). In some embodiments, a transfer generation model is embodied by or comprises a transfer optimization model.

The term "weight" refers to electronically managed data representing a determined probability that a particular transfer is to be accepted by user profiles associated with the transfer. In some example contexts, a weight is determined for a particular transfer based on any of a myriad of data described herein, for example data associated with the user profile(s) associated with the transfer, data associated with the transferable data object(s) associated with the transfer, data stored and/or otherwise accessible to the system determining the weight, and/or the like as described herein. In some embodiments, transfer preference ranking data for a particular transfer comprises the weight for the particular transfer, and/or the transfer preference ranking data for a particular transfer is generated based on a weight for the particular transfer and/or weights for other possible transfers.

The terms "link" and "linked," where utilized with respect to a plurality of transfers refers to a plurality of transfers that are associated with one another as part of a multi-way transfer, such that completion of the plurality of transfers linked together satisfies certain preference associations for user profiles associated with such transfers.

The term "number of transfers" refers to a maximum number of sub-transfers that may be included to generate a transfer that satisfies at least one preference association for all user profiles associated with each sub-transfer. In some embodiments, for example, the number of transfers is incremented in circumstances where a lesser number of transfer(s) cannot be generated to satisfy preference associations for all users associated therewith.

The term "satisfy," where utilized with respect to a particular transferable data object and a preference association, refers to a determination of that the particular transferable data object is identified in the preference association or is associated with characteristics meeting desired characteristics embodied in the preference association. For example, in some embodiments, a preference association identifies a particular transferable data object, such that only the particular transferable data object will satisfy the preference association. In some embodiments, a preference association identifies particular characteristics, such that any particular transferable data object having such characteristics satisfy the preference association.

The term "satisfy," where utilized with respect to a particular transfer, refers to a determination that the transfer is associated with particular transferable data object(s) indicated in transfer association(s) for the user profile(s) associated with the transfer, and/or the transferable data object(s) associated with the transfer meet desired characteristics indicated the transfer association(s) for the user profile(s) associated with the transfer.

The term "entry" refers to one or more record(s) of a database that embody particular data, process(es), and/or states of operation associated with a process for generating and/or facilitating transfer(s) of transferable data object(s).

The term "preference association table" refers to one or more database(s) embodied in hardware, software, firmware, and/or a combination thereof, specially configured to maintain one or more entries corresponding to preference association(s) for one or more particular user profile(s). A preference association table may include entries that indicate a particular user profile is associated with any number of preference association(s).

The term "transfers table" refers to one or more database(s) or portions thereof, embodied in hardware, software, firmware, and/or a combination thereof, specially configured to maintain one or more entries corresponding to transfer(s) initiated and/or completed by particular user profile(s). A transfer table may include entries that indicate a transfer status, for example representing that a particular user profile initiated a particular transfer, is awaiting acceptance of a transfer by another user profile, is awaiting acceptance of a transfer by the user profile, or has completed a transfer. It should be appreciated that each entry associated with a transfer may include or otherwise indicate any of a number of other transfer statuses.

The term "transfer request notice" refers to renderable electronically managed data that indicates a transfer has been initiated associated with the user profile. In some embodiments, a transfer request notice is renderable to a client device associated with a user profile to enable acceptance or declination of the transfer corresponding to the transfer request notice.

The term "transfer initiation response data" refers to electronically managed data corresponding to a particular user profile and received associated with a particular transfer that indicates whether the particular user profile accepted or declined the particular transfer. Transfer initiation response data for a particular user profile may be received in response to a transfer request notice provided to the user profile.

The term "acceptance data object" refers to particular transfer initiation response data that indicates a corresponding user profile accepted a particular transfer.

The term "declining data object" refers to particular transfer initiation response data that indicates a corresponding user profile declined a particular transfer.

The term "transfer declination notice" refers to renderable electronically managed data that indicates another user profile declined a transfer or linked transfer associated therewith. In the context of a two-way transfer, for example, a transfer declination notice provided to a first user may indicate that the other user declined the transfer. In the context of a multi-way transfer, for example, a transfer declination notice may be provided to all other user profiles associated with the multi-way transfer in a circumstance where a particular user profile denies any portion of the multi-way transfer.

The term "object resource value data" refers to electronically managed data representing a resource value associated with a particular transferable data object. Transfer resource value data may be user-inputted, automatically determined, predetermined, and/or calculated. Non-limiting examples of a resource value associated with a particular transferable data object include a resource cost to obtain the transferable data object via transfer (e.g., an amount of computing memory required for storage of a transferable object, an amount of computing power associated with generation and/or storage of the transferable data object, an amount of networking resources utilized or required in transmission of the transferable data object, and/or a price for the transferable data object). In some embodiments, the object resource value data is automatically determined by and/or automatically processed by one or more particular algorithm(s) initiated associated with generation and/or transfer of the transferable data object (e.g., a smart contract of a blockchain or cryptocurrency system).

The term "resource differential" refers to a determined difference between first object resource value data associated with a first transferable data object and second object resource value data associated with a second transferable data object.

The term "vertical" refers to a defined category of transferable data object.

Overview

Platforms used for transfer of objects (e.g., collectibles, trading cards, items, products, virtual items, and/or the like) traditionally require users to search for products and initiate their own trades. Platforms such as Facebook& groups require traders to search through a long list of posts. Many of these posts are outdated, i.e., the item is no longer available or has already been traded. These platforms require the user to expend a lot of time and effort to complete a trade, and such platforms lack, amongst other things, accurate data management and tracking functionality as transfers are identified, proposed, and/or completed. Additionally, on other consumer-to-consumer (C2C) marketplace platforms such as eBay® and OfferUp®, trading is unsupported or prohibited.

In this regard, such platforms face a myriad of technical deficiencies, inefficiencies, and problems. For example, such platforms may enable searching functionality for representations of available items. Such platforms, however, remain incapable of using such representations as input for algorithms, models, and/or the like, that automatically provide transfers that satisfy the user's applicable preferences. Such platforms often fail to accurately manage available items, leading such platforms to entirely waste computing resources on serving data for such unavailable items, initiating transfers for such unavailable items, and the like. In this regard, users expend significant time and waste significant computing resources in performing searches for available items, where such searches may ultimately result in manually-initiated transfers that nevertheless cannot be performed as the underlying item is actually not available. These deficiencies further eliminate the ability for such platforms to accurately provide automatically generated transfers, let alone perform such transfers in a manner that is both accurate and efficient in its allocation of computing resources. There remains a need for a C2C marketplace that is able to facilitate transfer(s) of goods, and further to generate and/or facilitate such transfer(s) effectively and that accurately satisfy user's applicable preferences.

Such platforms face further technical inefficiencies and difficulties with respect to generation and facilitation of trades. Often, such platforms waste significant computing resources (e.g., processing resources, networking resources, memory resources, processing time, and the like) by processing user queries and/or arbitrarily serving data to a user that the user is uninterested in, lacks resources for, and/or that otherwise is not likely to be interacted with by the user. For example, each search query may utilize computing resources not only to accomplish the search, but also to provide suitable interfaces for displaying such results to the user. Inefficiencies in the operations of such platforms, for example lack of any or properly configured data management and tracking systems, further exacerbate such inefficiencies. For example, a user that is displayed, provided as a search result, and/or otherwise interacts with an item that has already been transferred is entirely wasted, since even in a circumstance where the user wants to initiate a transfer for said item, it remains no longer available. It is desirable to minimize the amount of computing resources utilized to successfully generate and/or facilitate a transfer, and further ideal to eliminate computing resources wasted by the operations of such conventional platforms.

Embodiments of the present disclosure overcome the aforementioned challenges by automatically generating transfers between users based on various factors, facilitating such transfer(s) and acceptance thereof by associated users, and providing means for data management and tracking. The present disclosure allows for determination of multi-party transfers, e.g., a multi-party transfer embodying a circle of transfers, even in circumstances where a two-party or lesser-party transfer that satisfies all applicable criteria (e.g., preference associations) is not possible. In this regard, such embodiments generate transfer(s) that sufficiently satisfy user preferences and associated requirements without the waste of computing resources described above.

Some embodiments of the present disclosure may further automatically perform various operations associated with generating and/or facilitating transfer(s) of transferable data object(s). For example, some embodiments automatically generate object resource value data for transferable data object(s). Such embodiments may utilize particular algorithm(s), models (e.g., machine-learning based models), application programming interface(s), and/or the like to improve the accuracy of the resulting generated object resource value data as compared to manual input (e.g., from the associated user). In addition to the improved accuracy, some such embodiments utilize the generated object resource value data for one or more transferable data object(s) to determine transferable data object(s) that may be matched for transfer. In this regard, the improved accuracy of the generated object resource value data further reduces computing resources that may be wasted in conventional platforms by ensuring an accurate match is made, thus reducing the number of data processes, interfaces, and transmissions sent to a user for a trade that would otherwise be utilized for inaccurate transfers unlikely to be acted on or otherwise accepted by one or more user(s).

Users generate entries to build an object availability repository of offered data objects, which in certain instances correlate with offered physical objects, by uploading data embodying the transferable data objects to the object availability repository of a transfer processing system for association with the user's corresponding user profile. The uploaded data for a particular transferable data object causes the creation of an available transferable data object representing the offered data objects, which embodies object detail data for the transferable data object. In embodiments, the data of the transferable data object comprises one or more images (e.g., photographs of a physical object, one or more images embodying the transferred data object, such as an image associated with an NFT), the condition of the transferable data object, a text description of the transferable data object, a blockchain wallet address, decryption key, and/or the like for accessing a data object, and/or the requirements for object resource values to obtain the transferable data object via transfer (e.g., a price for the object). In some embodiments, the data for the transferable data object includes additional resource requirements, such as a shipping cost for transfer of the transferable data object. In some embodiments, the data of the transferable data object includes a local pickup option. In embodiments, the local pickup option includes a zip code or particular locality information (e.g., an address). Each listing is associated with the user profile that uploaded the data as the sender of the transferable data object.

A listed or otherwise available transferable data object may be maintained by the transfer processing system until another user profile initiates a transfer for the transferable data object. The transfer processing system may automatically generate such transfer(s), as described herein, and/or facilitate the transfer between various user profile(s). In some embodiments, the transferable data object is automatically removed from association with the sender user profile, and/or from an object repository including available transfer object(s), after a transfer is complete.

Example of a Two-Party Transfer

Adam has a vacuum and a blender, and he wants toaster oven. Betty has a toaster oven, and she wants a vacuum. Alternatively, Betty has a toaster oven and wants a vacuum and blender. Embodiments provided herein, for example embodied by the transfer processing device 103, generate a trade between Adam and Betty so that Adam receives a toaster oven via transfer from Betty, and Betty receives a vacuum, or a vacuum and a blender in the alternative example, via transfer(s) from Adam. Such transfer(s) may be automatically identified, matched, and selected based on any of a myriad of criteria, data, and/or the like, as described herein. Systems and methods as discussed herein enable identification and/or generation of these desired transfers based on comparisons between available data objects stored within a memory accessible to the system and associated with each user profile and corresponding to their respective physical objects that are available for trade. Additionally or alternatively, some such embodiments may automatically manage acceptances of said transfer(s) and/or manage transferable data objects made available for transfers to other user(s)

Example of a Multi-Party Transfer

Adam has a vacuum, and he wants a stroller. Carlos has a stroller but does not need a vacuum and would like a blender. However, Betty has a blender, and wants a vacuum. Embodiments provided herein, for example embodied by the transfer processing device 103, generates a trade between Adam (vacuum), Betty (blender), and Carlos (stroller) so that Adam gets the stroller, Betty gets the vacuum, and Carlos gets the blender, via transfers. Such transfers may be automatically identified, matched, and selected based on a myriad of criteria, data, and/or the like, as described herein. A multi-party transfer expands the circle of available traders to make a trade possible that would otherwise not be possible merely with two parties. Like the two-party transfer configuration discussed above, the described systems and methods enable identification and/or generation of these desired multi-party transfers based on comparisons between available data objects stored within a memory accessible to the system and associated with each user profile and corresponding to their respective physical objects that are available for trade.

Example System of the Disclosure

FIG. 1 illustrates an exemplary system 100 for generating transfers according to embodiments of the present disclosure.

The exemplary system 100 comprises a transferable data object transfer processing system 102 ("transfer processing system 102") that may comprise one or more computing apparatuses, devices, and/or systems, such as transfer processing device 103, a user identification repository 104, and/or object repository 105. The transfer processing device 103 may comprise or be embodied in one or more computing device(s), sub-system(s), apparatus(es), and/or the like, comprising hardware, software, firmware, and/or the like, such as the transfer processing apparatus shown in FIG. 2, for generating transfers between two or more users. In some embodiments, for example, the transfer processing device 103 includes or is embodied by one or more server(s) specially configured via software and/or firmware (e.g., software applications executed on the server hardware) for performing any or all of the various computer-implemented processes described herein. The transfer processing device 103 may include or interact with the user identification repository 104 and/or object repository 105 to accomplish such operations. Additionally or alternatively, the transfer processing system 102 may be in communication with one or more devices such as client devices 107A-M via one or more communication networks, such as the communication network 106.

The user identification repository 104 comprises one or more computing devices, apparatuses, and/or systems, that are specially configured to store, retrieve, and/or otherwise make available user profiles and associated data. The user identification repository 104 may be embodied entirely in hardware, entirely in software, entirely in firmware, and/or any combination thereof. For example, in some embodiments, the user identification repository 104 is embodied in one or more computing devices comprising hardware specially configured via software and/or firmware to perform the operations for maintaining user profiles and/or associated data as described. In some embodiments, the user identification repository 104 is embodied entirely virtually (e.g., embodied entirely in software, and/or a combination of software and firmware), for example as a virtual component of the transfer processing device 103.

In some embodiments, a user may register a user profile associated with the transfer processing system 102 to generate and store information embodying the user profile to the user identification repository 104. For example, at least a user profile identifier corresponding to the user profile may be generated and/or stored to the user identification repository 104. The user profile identifier may be generated and/or stored via the transfer processing device 103, for example in response to interactions from a user to register the new user profile. In some such embodiments, for example, the user identification repository 104 may maintain a record (e.g., an entry) in the database corresponding to the particular user profile represented by the record, where the record includes sub-entries (e.g., columns) corresponding to values for various data properties associated with the user profile. In other embodiments, multiple entries embody all information corresponding to a particular user profile.

Alternatively or additionally, the user identification repository 104 may store biographical data for the user corresponding to the user profile, preference data corresponding to the user profile, preference association(s) corresponding to the user profile, and/or the like. Each of such data may be stored within the same record in the user identification repository 104, in different records within the user identification repository 104, and/or in various sub-repositories of the user identification repository 104. For example, in some embodiments, the user identification repository 104 includes a preference association sub-repository (e.g., a preference association table) that includes records embodying preference association(s) generated by and/or otherwise corresponding to each user profile.

The object repository 105 comprises one or more computing devices, apparatuses, and/or systems, that are specially configured to store, retrieve, and/or otherwise make available transferable data objects associated with particular user profile(s), maintain an object availability sub-repository including available transferable data object(s), and/or track the status for transfers of transferable data object(s) between user profiles. The object repository 105 may be embodied entirely in hardware, entirely in software, entirely in firmware, and/or any combination thereof. For example, in some embodiments, the object repository 105 is embodied in one or more computing devices comprising hardware specially configured via software and/or firmware to perform the operations for maintaining transferable data object(s) and/or data associated therewith, as described. In some embodiments, the object repository 105 is embodied entirely virtually (e.g., embodied entirely in software, and/or a combination of software and firmware), for example as a virtual component of the transfer processing device 103.

In some embodiments, a user profile accesses particular functionality to store a new transferable data object associated with the user profile. In this regard, the transferable data object may correspond to a particular item (either real or virtual) owned by the user corresponding to the user profile. For example, a user in possession of a particular collectible (e.g., a collectible pin) may store a transferable data object representing the collectible to the object repository 105 via their user profile. In this regard, the newly created transferable data object may be stored associated with the user profile such that the user profile may be accessed to initiate transfer of the transferable data object in exchange for a different collectible object associated with another user profile.

In some embodiments, the object repository 105 includes and/or otherwise stores data embodying transfers of the transferable data objects within the object repository 105. Such data may be stored in the same record embodying the transferable data object, and/or may be stored within various sub-repositories of the object repository 105. For example, in some embodiments, the object repository 105 includes a transfers sub-repository (e.g., a transfers table) that includes records embodying transfers of transferable data objects that are offered, in progress (e.g., accepted and pending completion), and/or completed.

In this regard, a user may initiate a transfer of a transferable data object they have associated with their user profile, for example in exchange for a transfer of a second transferable data object associated with a different, second user profile. Such transfers may be automatically identified as matches by the transfer processing system 102, for example as described herein. One or more new records embodying or associated with the transfers may be generated and stored to the object repository 105. The records may include or be associated with a transfer status that indicates whether the transfer has been proposed (e.g., initiated by a user but not yet accepted or declined by the second user), accepted and pending completion (e.g., accepted but the transferable data objects have not yet been provided between users), declined (e.g., the second user has declined the transfer), and/or completed (e.g., transfer was accepted and transferable data objects were provided between the users). In some embodiments, the transfers repository is maintained separately from the object repository 105, for example to enable more efficient and/or effective storage of such data, and/or to enable efficient querying of such data within the transfers repository and/or object repository.

The communication network 106 may include any wired or wireless communication network including, for example, a wired or wireless local area network (LAN), personal area network (PAN), metropolitan area network (MAN), wide area network (WAN), or the like, as well as any hardware, software and/or firmware required to implement such a communication network (such as, e.g., network routers, etc.). For example, communication network 106 may include a cellular telephone, a 902.11, 902.16, 902.20, and/or WiMax network. Further, the communication network 106 may include a public network, such as the Internet, a private network, such as an intranet, or combinations thereof, and/or a hybrid network comprising a public and private portion. The communication network 106 may utilize any of a variety of networking protocols now available or later developed including, but not limited to TCP/IP based networking protocols.

A particular user may access the transfer processing system 102 via any one of the client devices 107A or 107B ("client devices 107"). In some embodiments, each of the client devices 107 embodies one or more computing device(s) specially configured to enable user-facing functionality of the transfer processing system 102. For example, in some embodiments, each of the client devices 107 is embodied in hardware, software, firmware, and/or any combination thereof that provides access to at least one user-facing application enabling access to the transfer processing system 102 for viewing available transferable data objects, initiating transfers for one or more transferable data object(s), updating preference associations for a particular user profile, interacting with (e.g., accepting or declining) initiated but outstanding transfers associated with the user profile, and/or the like. In one example context, each of the client devices 107 is embodied by a mobile computing device configured to execute a native user-facing application and/or access a user-facing web application executed on the client device.

The user of one of the client devices 107 may access the user-facing application(s) executed on the client device to initiate operations associated with the transfer processing system 102, receive data in response to such operations, render user interfaces (including virtual reality interface(s), augmented reality interface(s), conventionally rendered interface(s), and/or the like) associated with such operations, and/or interacting with such rendered user interfaces to initiate further operations. A client device may transmit specially configured requests, receive response data, and/or process such response data to perform any one of the operations. Additionally or alternatively, some or all of the operations may be performed entirely by client-side instructions executing on the client device (e.g., via a client-facing application without requests to the transfer processing system 102).

In some embodiments, a user of one of the client devices 107 may utilize the client device to initiate an authenticated session associated with a particular user profile registered with the transfer processing system 102. Once verified, for example using user authentication credentials, an authenticated session may be established between the transfer processing system 102 and the particular client device that enables access to functionality associated with the user profile, such as to update preference associations associated with the user profile, associate new transferable data objects with the user profile, initiate transfers for particular transferable data objects and/or transferring particular transferable data objects currently associated with the user profile (e.g., currently owned objects) to another user profile, accepting and/or rejecting outstanding transfers, and/or the like. In this regard, in some embodiments, each of the client devices 107 may include input/output circuitry (e.g., touch-adaptive displays, input/output devices, wireless network communication interfaces, peripheral devices, and/or the like) that enable the user of the client device to view rendered information and/or perform any of such operations.

In some embodiments, the client device 107A is associated with a first user profile, and the client device 107B is associated with a second user profile. For example, distinct users may utilize each client device to access the transfer processing system 102, but may initiate an authenticated session associated with each of the different user profiles by authenticating using different authentication credentials associated with the different user profiles. In this regard, the first user profile associated with the client device 107A may be utilized to generate, review, and/or perform actions associated with the first user profile, and/or to generate new transferable data objects corresponding to the first user profile. Similarly, the second user profile associated with the client device 107B may be utilized to generate, review, and/or perform actions associated with the second user profile, and/or to generate new transferable data objects corresponding to the second user profile. In this regard, the functionality and/or data accessible via each of the client devices 107A and 107B may differ to reflect the data associated with and/or otherwise available to each of the first user profile and second user profile, respectively. For example, the transfers initiated and pending for the first user profile may be viewed via the client device 107A, whereas transfers initiated and pending for the second user profile may be viewed via the second device 107B. It should be appreciated that a particular user may utilize any number of client devices to authenticate a particular user profile, initiate an authenticated session corresponding to the user profile, and perform any of a myriad of functionality associated with the user profile as described herein.

The example system 100 further comprises external activity system(s) 108. Each of the external activity system(s) 108 comprises one or more computing device(s), server(s), system(s), and/or the like embodied in hardware, software, firmware, and/or a combination thereof. The external activity system(s) 108 may each provide particular users (e.g., clients of said system(s)) access to various functionality provided by the system(s). In this regard, as a user interacts with each of the external activity system(s) 108, data records and/or information may be generated and/or stored by the external activity system(s) 108 and/or the client device(s) utilized to access the external activity system(s) 108 (for example, one or more of the client devices 107). It should be appreciated that each user may register one or more external user profiles associated with such external activity system(s) 108, such that the user may authenticate the external user profile to initiate an authenticated session with the external activity system(s) 108. The authenticated session may be linked to the external user profile that the user authenticated, such that the authenticated session may be utilized to access particular functionality of the external activity system(s) 108 accessible to the authenticated external user profile and/or access data associated with or otherwise linked to the authenticated external user profile.

The transfer processing system 102 may obtain, collect, and/or otherwise identify external activity data associated with interactions between one or more of the external activity system(s) 108 and a user corresponding to a particular user profile of the transfer processing system 102. For example, in some embodiments the transfer processing system 102 may engage one or more of the external activity system(s) 102 to retrieve external activity data from such one or more of the external activity system(s) 102. In some such embodiments, the transfer processing system 102 engages each of the external activity system(s) 108 via a specially configured application programming interface (API) corresponding to and/or made available by the external activity system(s) 108 to obtain the external activity data from such system(s). Alternatively or additionally, in some embodiments the transfer processing system 102 retrieves, receives, collects, and/or otherwise identifies external activity data from one or more of the client devices 107 associated with interaction(s) between the client devices 107 and one or more of the external activity system(s) 108. External activity data may include log data indicating access of the external activity system(s) 108 via a client device, search queries transmitted to the external activity system(s) 108 for processing, response data provided by the external activity system(s) 108, transaction(s) initiated via the external activity system(s) 108, and/or the like. In this regard, preferences, data association(s) (e.g., preference association(s)), and/or the like may be determined based at least in part on the external activity data, for example by the transfer processing system 102.

Example Apparatuses of the Disclosure

The methods, apparatuses, systems, and computer program products of the present disclosure may be embodied by any variety of devices. Such embodiments may include or be embodied by remote system(s) in communication with one or more client device(s) that interact with such system(s) to access particular functionality provided by said system(s). For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In some embodiments, the transfer processing system 102, and/or subcomponents thereof such as the transfer processing device 103, is embodied by one or more specially configured apparatuses, such as the transfer processing apparatus 200. As illustrated in FIG. 2, the exemplary transfer processing apparatus 200 may comprise processor 202, memory 201, input/output circuitry 203, communications circuitry 206, transfer management circuitry 204, and user management circuitry 205. The transfer processing apparatus 200 may be configured to execute the operations described herein. Although some of these components 201-206 are described with respect to their functional capabilities, it should be understood that the particular implementations necessarily include the use of particular hardware to implement such functional capabilities. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the transfer processing apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input/output devices, and other components. In some embodiments, other elements of the transfer processing apparatus 200 may provide or supplement the functionality of particular circuitry. For example, the processing circuitry 202 may provide processing functionality, memory 201 may provide storage functionality, and communications circuitry 206 may provide network interface functionality, among other features.

In some embodiments, the processor 202 (and/or coprocessor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. For example, the memory 201 may be an electronic storage device (e.g., a computer readable storage medium). In another example, the memory 201 may be a non-transitory computer-readable storage medium storing computer-executable program code instructions that, when executed by a computing system, cause the computing system to perform the various operations described herein. The memory 201 may be configured to store information, data, content, signals applications, instructions (e.g., computer-executable program code instructions), or the like, for enabling the transfer processing apparatus 200 to carry out various functions in accordance with example embodiments of the present disclosure. It will be understood that the memory 201 may be configured to store partially or wholly any electronic information, data, data structures, embodiments, examples, figures, processes, operations, techniques, algorithms, instructions, systems, apparatuses, methods, or computer program products described herein, or any combination thereof.

The processor 202 may be embodied in a number of different ways and may, for example, include one or more processing devices configured to perform independently. Additionally or alternatively, the processor 202 may include one or more processors configured in tandem via a bus to enable independent execution of instructions, pipelining, multithreading, or a combination thereof. The use of the term "processor" may be understood to include a single core processor, a multi-core processor, multiple processors internal to the apparatus, remote or "cloud" processors, or a combination thereof.

In an exemplary embodiment, the processor circuitry 202 may be configured to execute instructions stored in the memory 201 or otherwise accessible to the processor 202. Alternatively or additionally, the processor 202 may be configured to execute hard-coded functionality. As such, whether configured by hardware or software methods, or by a combination of hardware with software, the processor 202 may represent an entity (e.g., physically embodied in circuitry) capable of performing operations according to an embodiment of the present disclosure while configured accordingly. As another example, when the processor 202 is embodied as an executor of program code instructions, the instructions may specifically configure the processor to perform the operations described herein when the instructions are executed.

As one example context, the processor 202 is configured to provide functionality associated with generating and/or facilitating transfers of transferable data objects, for example via the transfer processing apparatus 200. In some such embodiments, the processor 202 is configured to provide such functionality including generating new user profile(s) (e.g., via a user registration process), and/or managing settings and/or data associated with user profile(s). Such data includes generating and/or removing preference association(s) for particular transferable data object(s). Additionally or alternatively, in some embodiments, the processor 202 is configured to provide functionality including generation and/or management of transferable data object(s) associated with each user profile, as described herein. Additionally or alternatively still, in some embodiments, the processor 202 is configured to provide functionality including generation and/or management of transfers between user profile(s), as described herein.

In some embodiments, the transfer processing apparatus 200 may include input/output circuitry 203. In some embodiments, the input/output circuitry 203 may, in turn, be in communication with processor 202 to provide output to the user and, in some embodiments, to receive input such as a command provided by the user. The input/output circuitry 203 may comprise a user interface, such as a graphical user interface (GUI), and may include a display that may include a web user interface, a GUI application, a mobile application, a client device, or any other suitable hardware or software. In some embodiments, the input/output circuitry 203 may also include a keyboard, a mouse, a joystick, a display device, a display screen, a touch screen, touch areas, soft keys, a microphone, a speaker, an electronic pen or stylus, or other input/output mechanisms. The processor 202, input/output circuitry 203 (which may utilize the processor 202), or both may be configured to control one or more functions of one or more user interface elements through computer-executable program code instructions (e.g., software, firmware) stored in a non-transitory computer-readable storage medium (e.g., memory 201). In some embodiments, the input/output circuitry 203 includes virtually maintained data elements and/or interactions therewith, for example virtual reality data element(s), augmented reality data element(s), augmented reality interface element(s), virtual reality interface element(s), and/or the like. In some such embodiments, user input may be provided via the virtually maintained data elements, for example a user may interact with virtual reality and/or augmented reality buttons, objects, and/or other interface controls.

In some embodiments, the input/output circuitry 203 is optional and, in some embodiments, the transfer processing apparatus 200 may not include input/output circuitry at all. For example, where the transfer processing device 103 does not interact directly with the user, the transfer processing apparatus 200 may generate and/or provide user interface data for display by one or more other devices with which one or more users directly interact and transmit the generated user interface data to one or more of those devices, such as a client device associated with a particular user profile.

The communications circuitry 206 may be any device or circuitry embodied in either hardware or a combination of hardware and software that is configured to receive or transmit data from or to a network or any other device, circuitry, or module in communication with the transfer processing apparatus 200. In this regard, the communications circuitry 206 may include, for example, a network interface for enabling communications with a wired or wireless communication network. For example, the communications circuitry 206 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted or received by the transfer processing apparatus 200 using any of a number of Internet, Ethernet, cellular, satellite, or wireless technologies, such as IEEE 802.11, Code Division Multiple Access (CDMA), Global System for Mobiles (GSM), Universal Mobile Telecommunications System (UMTS), Long-Term Evolution (LTE), Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies.

The transfer management circuitry 204 includes hardware components designed or configured to receive, process, generate, and transmit data and provide functionality for managing associations between transferable data objects and user profiles, managing preference associations between a user profile and particular transferable data object(s), managing available transferable data objects, and managing transfers between user profiles. For example, the transfer management circuitry 204 includes hardware, software, firmware, and/or a combination thereof, for automatically generating transfer(s) for one or more transferable data object(s), facilitating acceptance and/or declination of such transfer(s), and/or the like, as described herein. In some embodiments, the transfer management circuitry 204 includes hardware, software, firmware, and/or a combination thereof, for generating data associated with one or more transferable data object(s), transfer(s), and/or the like. For example, the transfer management circuitry 204 may include hardware, software, firmware, and/or the like, to generate object resource value data for one or more transferable data object(s).

In some embodiments, the transfer processing apparatus 200 maintains one or more blockchain implementations that store data associated with functionality accessed via and/or operations of the transfer processing system. In some such embodiments, for example, the transfer management circuitry 204 includes hardware, software, or a combination thereof, configured for storing information corresponding to transfers generated, initiated, actioned upon, and/or otherwise completed by one or more user profile(s). Such blockchain(s) may include data indicating that a particular transfer has been generated and/or provided to corresponding user profiles (e.g., as an offered transfer), indications of the user profiles associated with each transfer, data indicating status updates for each transfer (e.g., one or more records indicating when each user profile submits transfer initiation response data), and/or the like. In this regard, the blockchain(s) may embody an immutable, trusted, and accurate representation of the transfers that were initiated, actioned upon, and/or completed via the transfer processing apparatus 200. Additionally or alternatively, in some embodiments, the transfer management circuitry 204 includes hardware, software, firmware, and/or a combination thereof, to retrieve and/or process information from such blockchain(s), for example to determine similarities between aspects of user profiles associated with certain trends in transfers (e.g., what users are most probable to like certain transferable data objects based on their trading activity, and/or other data), generate data based on such blockchain information, and/or the like.

In some embodiments, the transfer management circuitry 204 may be in communication with the communications circuitry 206 and thus configured to receive data from the communications circuitry 206. Alternatively or additionally, in some embodiments the transfer management circuitry 204 leverages or is embodied by processing circuitry, such as the processor 202, to perform one or more of the actions described herein. As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The user management circuitry 205 includes hardware components designed or configured to receive, process, generate, and transmit data associated with user profile(s), such as the input data indicating preference associations between a particular user profile and particular transferable data object(s). Additionally or alternatively, the user management circuitry 205 includes hardware, software, firmware, and/or the like, to generate new user profile(s) via a registration process. Additionally or alternatively still, the user management circuitry 205 includes hardware, software, firmware, and/or the like, to automatically facilitate and/or otherwise fulfil transfers based on a user profile. In some embodiments, the transfer management circuitry 204 includes hardware, software, firmware, and/or a combination thereof, configured to automatically generate preference association(s) associated with a user profile, and/or automatically identify user preferences for a particular user profile based on any combination of data associated with the user profile and/or other user profiles determined similar to the user profile based on one or more data parameters. In some embodiments, additionally or alternatively, the user management circuitry 205 includes hardware, software, firmware, and/or the like, to retrieve, collect, and/or otherwise identify external activity data associated with each user profile registered associated with the transfer processing apparatus 200.

In some embodiments, the transfer processing apparatus 200 maintains one or more blockchain implementations that store data associated with functionality accessed via and/or operations of the transfer processing system. For example, in some embodiments, the user management circuitry 205 includes hardware, software, or a combination thereof, configured for storing information corresponding to transferable data objects indicated as available by a particular user profile. Such blockchain(s) may include data indicating that a particular transferable object has been marked or otherwise indicated as an available transferable data object, user-inputted and/or automatically determined information associated with the transferable data object (e.g., object resource value data inputted by the user corresponding to the user profile, transferable object description information inputted by the user corresponding to the user profile, condition data for the transferable data object inputted by the user corresponding to the user profile, and/or the like). In circumstances where the user profile corresponding to the available transferable data object is further accessed to alter the available transferable data object and/or data associated therewith (e.g., alter description data, object resource value data, and/or the like), the user management circuitry 205 may be configured to store one or more associated records to the blockchain(s). In this regard, the user management circuitry 205 may interact with such blockchain(s) to generate an immutable and accurate record of transferable objects inputted as associated with a particular user profile, indications of such transferable data objects becoming available for transfer, detail data associated with the available transfer data object, and/or the like, as various user profiles interact with the embodiments described herein.

In some embodiments, the user management circuitry 205 may be in communication with the communications circuitry 206 and thus configured to receive data from the communications circuitry 206. Alternatively or additionally, in some embodiments the transfer management circuitry 204 leverages or is embodied by processing circuitry, such as the processor 202, to perform one or more of the actions described herein. As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

In some embodiments, one or more of the aforementioned sets of circuitry are combined to form a single set of circuitry. The single combined set of circuitry may be configured to perform some or all of the functionality described herein with respect to the individual sets of circuitry. For example, in at least one embodiment, circuitry 210 and/or 212 may be embodied by a single set of circuitry, and/or one or more of the circuitry 210 and/or 212, may be combined with the processor 202. Additionally or alternatively, in some embodiments, one or more of the sets of circuitry described herein may be configured to perform one or more of the actions described with respect to one or more of the other sets of circuitry.

Example Data Objects and Computing Environments of the Disclosure

FIG. 3 illustrates example data representations of a computing environment in accordance with at least some embodiments of the present disclosure. It should be appreciated that the various data representations may correspond to one or more data objects maintained by one or more computing device(s), for example by the transfer processing apparatus 200, and/or the transfer processing apparatus 200 together with one or more associated client devices. For example, the transfer processing apparatus 200 may maintain one or more user profiles, preference association(s), and/or database entries available to the transfer processing apparatus 200.

It should be appreciated that embodiments described herein may initiate one or more process(es) for generating transfers at any of a myriad of points in time. Some embodiments initiate process(es) for generating transfers at particular timestamp intervals (e.g., daily, weekly, hourly, and/or the like). Additionally or alternatively, some embodiments initiate process(es) for generating transfers upon detecting occurrence of particular data triggers and/or user-initiated events. For example, in some embodiments, a process for generating transfer(s) is initiated upon indication by a user profile of a new preference association, such that the transfer processing apparatus 200 attempts to generate a transfer that satisfies the new preference association as expeditiously as possible (e.g., in real-time, or near real-time) if available transferable data objects enable such transfers to be generated.

FIG. 3 depicts a two-party transfer, specifically between user profile corresponding to user profile identifier USER_02 ("User 2") and user profile corresponding to user profile identifier USER_01 ("User 1"). Specifically, the two-party transfer is embodied by the two linked transfers embodied by entries 306A and 306B depicted in transfers table 306. Such transfers may be automatically identified in accordance with one or more of the embodiments described herein, for example by the transfer processing apparatus 200 as depicted and described herein. For example, the transfer processing apparatus 200 may generate the transfers based at least on data included in and/or associated with the user profiles for USER_01 and USER_02.

As depicted for the two-party transfer, each user profile may include or be associated with any number of preference associations and any number of available objects. User 1, for example, is associated with preference associations set 304A, and User 2 is associated with preference associations set 302A. Each preference association may represent a particular transferable data object liked by the corresponding user, or otherwise a transferable data object that the corresponding user would like to obtain via transfer. In this regard, the preference associations set 302A includes any number of preference associations corresponding to User 1. Similarly, the preference associations set 304A includes any number of preference associations corresponding to User 2. As depicted, User 2 corresponds to preference associations for transferable data objects associated with identifiers "XYZ," "PLM," and "OKN." In some embodiments, such identifiers correspond to a specific transferable data object (e.g., a particular collectible pin, SKU of an item, and/or the like). In other embodiments, one or more preference association is associated with an identifier corresponding to a particular type of transferable data object or category of transferable data object. For example, identifier "XYZ" may correspond to a toaster, and/or identifier "PLM" may correspond to a particular collectible figurine, and/or identifier "OKN" may correspond to a transferable data objects associated with a particular video game (e.g., products or other items associated with the Overwatch™ owned by Blizzard Entertainment, Inc.). Further, identifiers "ABC," "WSX," and "EDC" may correspond to other transferable data objects, categories of transferable data objects, and/or the like, liked or otherwise sought after by User 1.

It should be appreciated that the transfer processing system may be configured to enable preference associations based on various levels of detailed data corresponding to particular transferable data objects, such that in some embodiments preference associations may be defined based on higher-level descriptors (e.g., "Home furniture," or "Toasters" generally) or low-level detailed descriptors (e.g., "A 1983 rookie card for 'Baseball Player X' printed by Printing Company Y"). In this regard, a user may leverage such preference associations to define parameters for transfer as they desire. Some embodiments, for example the transfer processing apparatus 200, maintain a database of preference associations (e.g., a preference associations table) includes an entry for each association generated by a user for a particular user profile.

In some embodiments, a transfer processing apparatus 200 may generate the one or more preference associations corresponding to a user profile. For example, in some embodiments, the transfer processing apparatus 200 may process some or all available data associated with the user profile to identify preference associations corresponding to transferable data objects that, if offered via a transfer associated with the transferable data object, the user profile is likely to accept. The transfer processing apparatus 200 may be configured to generate one or more preference association(s) automatically based on the data associated with the user profile and/or other user profiles, such as by processing such data via one or more specially configured statistical, algorithmic, and/or machine learning model(s). Such models, for example a preference association generation model, transfer generation model comprising a preference association generation model, and/or transfer optimization model comprising a preference association model, may be configured to automatically generate preference associations that are determined most probable to be accepted based on the corresponding input data. In this regard, such model(s) may be configured and/or trained based on historical training data such that the model learns applicable data trends, patterns, correlations, and/or the like, between user profile data and associated performed activity from the historical training data. Subsequent to training, the transfer processing apparatus 200 may leverage such model(s) trained with such learned information to accurately generate preference association(s) that, if a transfer is generated satisfying such a preference association (e.g., including a transferable data object that satisfies the preference association) is most likely to be accepted by the user corresponding to the user profile.

In this regard, in some such embodiments, preference associations may be automatically generated without explicit user data indicating or requesting generation of such preference data objects. Additionally or alternatively, in some embodiments the automatically generated preference associations enables the transfer processing apparatus 200 to provide user profiles transfers that more accurately fit preferences and/or "likes" of transferable objects that the user corresponding to the user profile may not recognize or appreciate. By generating preference associations with increased accuracy, satisfying transfers may be provided to the corresponding user profiles in circumstances where such transfers are more likely to be accepted, thus reducing the likelihood of computing resources being wasted on providing such transfers to the user profile, networking resources in providing such transfers to client device(s) associated with the user profile, rendering corresponding user interfaces by client devices associated therewith, and/or the like, for such transfers to ultimately be declined.

Each user profile may similarly be associated with any number of transferable data objects owned or otherwise made available for transfer. In some embodiments, the user corresponding to a particular user profile may provide user input data representing transferable data object detail data for a particular transferable data object owned by the user. In this regard, the transfer processing apparatus 200 may maintain an object repository including associations between user profiles and transferable data objects inputted by such user profiles and/or transferred to the user profile. The object repository may include an entry for each transferable data object that includes transferable data object detail data for the transferable data object, one or more indicators associating the transferable data object with a particular user profile, data indicating whether the transferable data object is available for transfer, and/or the like. In some such embodiments, the transfer processing apparatus 200 may query the object repository to identify transferable data objects associated with a particular user profile that are available for transfer, for example based at least on the user profile identifier for the user profile.

Embodiments may generate transfers by comparing preference associations for a particular user profile with available objects associated with other user profile. As illustrated, for example, the transfer processing apparatus 200 may query an object repository, or object availability sub-repository thereof, for available transferable data objects that satisfy the preference associations corresponding to User 2, and determines that User 1 has an available transfer object associated with the identifier "XYZ." In some embodiments, the transfer processing apparatus 200 may maintain a set of available transferable data objects that satisfy a preference association corresponding to User 2. In this regard, upon determination by the transfer processing apparatus 200 that the transferable data object "XYZ" satisfies a preference association for User 2 (e.g., based on an object identifier for the transferable data object and/or transferable data object detail data for the transferable data object) the transfer processing apparatus 200 may include the available transferable data object or data that uniquely representing the corresponding available transferable data object, and/or data indicating the transferable data object is associated with a particular user profile, in the set of available transferable data objects that satisfy a preference association corresponding to User 2. The transfer processing apparatus 200 may continue to query the object repository to add other available transferable data objects that satisfy a preference association to the set.

The transfer processing apparatus 200 further determines whether a matching transfer may be generated for any of the user profiles that are associated with an available object that satisfies a preference association for User 2. In this regard, the transfer processing apparatus 200 may similarly query available transfer objects associated with User 2 that satisfy one or more preference association(s) corresponding to User 1. As illustrated, for example, the transfer processing apparatus 200 may query for available transfer objects associated with User 1, and compare each available transfer objects (and/or transfer object detail data associated therewith) with preference associations corresponding to User 1. The transfer processing apparatus 200 may identify that User 2 is associated with an available transferable data object that satisfies a preference association for User 1, namely the transferable data object corresponding to the object identifier "ABC." In this regard, a second transfer may be generated that is linked to the first transfer as a match, thus forming the two-party transfer. Upon generating linked transfers that complete a cycle of transfers between all user profiles involved (e.g., each user profile transfers at least one transferable data object as sender and receives at least one transferable data object as recipient), the transfer processing apparatus 200 may perform one or more subsequent actions as described herein.

In some embodiments, the transfer processing apparatus 200 generates and/or stores one or more entries in a transfers table, such as the transfers table 306, for each generated transfer. As illustrated, for example, the transfer processing apparatus 200 generates and/or stores a first entry 306A in the transfers table 306, where the first entry 306A embodies details for the first transfer from User 2 to User 1 of the transferable data object corresponding to identifier "XYZ." As illustrated, the first entry 306A includes a sender profile identifier (e.g., USER_02), a recipient profile identifier (e.g., USER_01), and an identifier representing the available transferable data object to be transferred (e.g., "XYZ"). Similarly, the transfer processing apparatus 200 generates and/or stores a second entry 306B in the transfers table 306, where the second entry 306B embodies details for the second transfer from User 1 to User 2 of the transferable data object corresponding to identifier "ABC." As illustrated, the second entry 306B similarly includes a sender profile identifier (e.g., USER_01), a recipient profile identifier (e.g., USER_02), and an identifier representing the available transferable data object to be transferred (e.g., "ABC"). It should be appreciated that, in other embodiments, entries in the transfers table 306 includes one or more additional and/or alternative data properties, for example a transfer initiated time, a transfer status, transfer acceptance status for each user involved with the transfer, and/or the like.

In some circumstances, the transfer processing apparatus 200 generates a multi-party transfer comprising transfers for three or more user profiles. FIG. 3 depicts an example of a multi-way transfer between four user profiles, namely User 1 and User 2 as well as a user profile corresponding to identifier "USER_03" ("User 3") and a user profile corresponding to identifier "USER_04" ("User 4"). It should be appreciated that in other contexts, a multi-way transfer may be generated for a different number of user profiles, for example three user profiles, five user profiles, or more.

In this regard, the transfer processing apparatus 200 may attempt to identify a two-way transfer between the users that satisfies preference associations for both involved user profiles. However, as illustrated, the transfer processing apparatus 200 may determine that such a transfer is not possible. For example the transferable processing apparatus may iterate through each user profile and determine that, for each first user profile, no transferable data object is available corresponding to a second user profile that satisfies a preference association for the first user profile in a circumstance where a transferable data object for the first user profile is similarly available and satisfies a second preference association for the second user profile. In other circumstances where such a determination is made, a two-party transfer between the user profiles may be generated instead.

The transfer processing apparatus 200 may generate a multi-way transfer by generating a chain of transfers that involve at least one transfer to and from each user profile associated with the multi-way transfer to satisfy a preference association for each user profile. As illustrated, for example, User 1 is associated with preference association set 352A comprising preference association for transferable data objects associated with identifiers "XYZ," "WSX," and "EDC." User 2 is associated with preference associations set 354A comprising preference associations for transferable data objects associated with identifiers "ABC," "TGB," and "YHN." User 3 is associated with preference association set 356A comprising preference associations for transferable data objects associated with identifiers "123," "YH4," and "UI5." User 4 is associated with preference associations set 358A comprising preference associations for transferable data objects associated with identifiers "789," "IK7," and "IK8."

Each of the user profiles is further associated with any number of available transferable data objects, which may be maintained for example in an object repository or sub-repository thereof (e.g., an object availability repository). As illustrated, User 1 is associated with an available transferable data objects set 352B, which includes a transferable data object corresponding to the identifier "789." User 2 is associated with an available transferable data objects set 354B, which includes a transferable data object corresponding to the identifier "XYZ." User 3 is associated with an available transferable data objects set 356B, which includes a transferable data object corresponding to the identifier "ABC." User 4 is associated with an available transferable data objects set 358B, which includes a transferable data object corresponding to the identifier "123."

As illustrated, the various available transfer objects and preference associations are not combinable in a manner to facilitate a two-way transfer between two user profiles, as such transfers cannot satisfy the preference associations for each user profile. In some embodiments, the transfer processing apparatus 200 attempts to generate transfers starting with two-way transfers, and in circumstances where such transfers cannot satisfy all applicable preference associations for the user profiles, increments a number of transfers possible to attempt to generate a more complex transfer involving more user profiles to determine if a satisfactory transfer including such multiple user profiles may be generated. In this regard, the transfer processing apparatus 200 may attempt a three-way transfer, for example, upon determining that a two-way transfer satisfying both user profile's preference associations cannot be generated. Upon determining that a satisfactory transfer similarly cannot be generated for a three-way transfer, the transfer processing apparatus 200 may again increment the number of transfers for consideration at once, such that the transfer processing apparatus attempts to generate a four-way transfer. This process may continue until a satisfactory transfer is found, in some embodiments until a maximum number of transfers is reached, and/or until all possible transfers from a particular set of transfers or universe of transfers are attempted and determined unsatisfactory. As illustrated, the transfer processing apparatus 200 determines a three-way transfer that satisfies preference associations for all user profiles engaged in the multi-way transfer is not possible, however a four-way transfer between the illustrated user profiles is possible.

As depicted, the transfer processing apparatus 200 determines a satisfactory four-way transfer is possible and generates transfer(s) as such. As illustrated, for example, the transfer processing apparatus 200 generates and/or stores entries to the transfers table 360 that embody the four-way transfer. Specifically, entry 360A represents a transfer from User 2 to User 1 of the transferable data object corresponding to the identifier "XYZ." Entry 360B represents a transfer from User 3 to User 2 of the transferable data object corresponding to the identifier "ABC." Entry 360C represents a transfer from User 4 to User 3 of the transferable data object corresponding to the identifier "123." Entry 360D represents a transfer from User 1 to User 4 of the transferable data object corresponding to the identifier "789." In this regard, such transfers satisfy the preference associations of each user profile associated with the transfer. In some other embodiments, a single entry is generated and/or stored to the transfers table 360 that embodies the various sub-transfers for the multi-way transfer. Additionally or alternatively, in some embodiments, the entries to the transfers table 360 may include one or more additional and/or alternative data attributes, such as an identifier that links the various transfers together (indicating they are each a component of a particular multi-way transfer), a transfer status for each sub-transfer, transfer initiator information, and/or the like.

By generating multi-way transfers, embodiments of the present disclosure provide improved accuracy and user functionality by enabling transfers of transferable data objects in circumstances where conventional systems generally fail to operate (e.g., systems limited to two-way transfers). Additionally, embodiments that automatically expand the number of transfers incrementally further provide technical advantages by minimizing the complexity of the resulting transfer and conserving resources if possible without sacrificing the ability to accurately generate a transfer if possible. In some circumstances, embodiments are configured to perform such operations automatically, thus reducing or eliminating required user input to identify sufficient available transferable data objects and generate and/or propose transfers. Additionally or alternatively, such embodiments enable automatic management of available transferable objects as transfers are automatically generated and/or completed to eliminate resources conventionally wasted on maintaining, serving, and/or otherwise interacting with unavailable objects in a system.

In some embodiments, the transfer processing apparatus 200 identifies multiple available transferable data objects that satisfy at least one preference association for a particular first user profile, and that are associated with a second user profile corresponding to a preference association satisfied by an available transferable data object associated with the first user profile. In this regard, the transfer processing apparatus 200 identifies a plurality of possible transfers that would satisfy some or all remaining aspects of the transfer. In such circumstances, the transfer processing apparatus 200 may determine which of the possible transfers is preferred based on any of a myriad of criteria. For example, in some embodiments, the transfer processing apparatus is configured to determine a preferred transfer based at least in part on object resource value data for each of the transferable data objects involved in a two-way or multi-way transfer, locality information for each user profile involved in a two-way or multi-way transfer, and/or other data properties included in, derived from, or associated with the available transferable data object(s) and/or associated user profiles for the possible transfers, and/or a combination thereof. Once a preferred transfer is identified, an entry corresponding to the preferred transfer may be generated and/or stored to the transfers table, such as transfers table 360.

In some embodiments, the transfer processing apparatus 200 begins generating transfers from the perspective of a particular user. For example, the transfer processing apparatus 200 may randomly select a particular user profile to generate transfers, iterate through each registered user profile to generate transfers for each of such user profiles, generate transfers for user profiles as such user profiles authenticate and/or "login" to access functionality associated with the transfer processing apparatus 200, and/or the like. In this regard, the transfer processing apparatus 200 may identify user-associated available transferable data objects associated with a selected user profile and determine other user profiles having preference associations that are satisfied by the user-associated available transferable data objects, where such other user profiles are associated with other available transferable data objects that satisfy a preference association for the particular selected user profile. Once the transfer processing apparatus 200 generates all possible and/or desired transfers for the selected user profile (e.g., up to a certain maximum number of generated transfers for example), the transfer processing apparatus 200 may select a next user profile for which to generate possible transfers.

FIG. 4 illustrates example data representations contributing to one or more transfer generation model(s) in accordance with at least some embodiments of the present disclosure. One or more transfer generation model(s) may be specially configured to match user profiles and/or available transferable data objects to generate two-way and/or multi-way transfer(s). In this regard, the transfer generation model may output preferred transfer(s) embodying such two-way and/or multi-way transfers, and/or sub-transfers thereof. The preferred transfer(s) may best fit certain criteria and/or determinations relevant to a particular user profile or each user profile involved in the transfer(s).

As illustrated, FIG. 4 depicts example representations of data that contribute to an example transfer generation model 400. In some embodiments, the transfer generation model 400 is embodied by one or more specially configured algorithmic, statistical, and/or machine learning model(s), that outputs preferred transfer(s) of a possible set of transfers between any number of user profile(s). Alternatively or additionally, in some embodiments, the transfer generation model 400 comprises or embodies a transfer optimization model that outputs preferred transfers from a set of possible transfers. The transfer generation model 400 may be maintained in one or more embodiments described herein, such as by the transfer processing apparatus 200, for use in generating transfer(s) between user profiles. It should be appreciated that, in other embodiments, the transfer generation model 400 may be configured based on alternative and/or additional data elements than those depicted and described with respect to FIG. 4.

The transfer generation model 400 may generate transfers for a particular user profile that satisfy preference association(s), user preference(s), and/or the like corresponding to the user profile. Alternatively or additionally, the transfer generation model 400 may identify possible transfers and generate preferred transfers of the possible set of transfers that are determined most likely to be accepted by the corresponding user profile(s). In this regard, the transfer generation model 400 may identify particular transfers that satisfy particular base requirements (e.g., satisfy a preference association for each user profile) to generate a set of possible transfers, and select preferred transfers from the set based on one or more subsequent determinations. For example, of all possible transfers, the transfer generation model 400 may determine which transfer is most probable to be accepted by the corresponding user profile(s) based on some or all of the data associated with the user profile(s). For example, the transfer generation model 400 may learn data trends, patterns, and/or the like, indicating what transfers are most likely to be accepted based on various data, interactions, engagements, and/or other information identified for a particular user profile. In this regard, the transfer generation model 400 may generate a weight for each possible transfer between user profile(s) based on the various data representations described herein, where the weight represents the likelihood that such transfer(s) will be accepted based on the various data representations depicted and described herein.

In yet some other embodiments, the transfer generation model 400, an associated model, and/or a sub-model thereof, generates preference association(s) for a particular user profile. The transfer generation model 400 may generate such preference associations based on any combination of data associated with the particular user profile and/or other user profiles (e.g., data indicating trends amongst user profiles that share particular characteristics, actions performed, habits, and/or the like as indicated by the data associated with such user profile(s)). In this regard, the transfer generation model 400 may be configured to generate one or more preference association(s) based on input data (e.g., one or more of the data representations depicted with respect to FIG. 4) that represent transferable data object(s), categories of transferable data object, and/or the like, for which preference association(s) should be generated, as transfers for such transferable data objects are more probable to be accepted by the user corresponding to the user profile.

As illustrated, the transfer generation model 400 is configured based at least in part on object resource value data 402. The object resource value data 402 comprises a determined object resource value for one or more available transferable data object being processed for possible transfer. In some embodiments, the object resource value data for a particular transferable data object is generated by the transfer processing apparatus 200, as described herein. In other embodiments, the object resource value data for one or more transferable data objects is retrieved (e.g., from one or more databases), user inputted, and/or otherwise determined. The object resource value data 402 may indicate an object resource values for each transferable data object being processed, for example for example such that the transfer generation model 400 may determine transferable data objects associated with object resource values that are close to one another (e.g., below a certain differential threshold), such that selection of these objects may be higher weighted than objects having larger differentials between their respective object resource value.

As further illustrated, the transfer generation model 400 is configured based at least in part on object domain data 404. Object domain data 404 comprises a determined domain for one or more available transferable data object being processed for possible transfer. The domain may be a data representation of a category, classification, and/or other grouping identifier that may be used to associate transferable data objects that fall within that domain. For example, a first domain representing "home furniture" may include different types of residential furniture (e.g., couch, television, lamp, and the like) whereas a second domain representing "kitchen appliances" may include different types of those items (e.g., mixer, blender, toaster, microwave, and the like). In some embodiments, domains may be automatically generated by the transfer processing apparatus 200. Alternatively or additionally, in some embodiments, the transfer processing apparatus 200 may include one or more predetermined domains. In some other embodiments, the transfer processing apparatus may include one or more user-inputted domains.

As further illustrated, the transfer generation model 400 is configured based at least in part on object transferability data 406. Object transferability data 406 comprises determined data representing the transferability of one or more available transferable data object being processed for possible transfer. The transferability of a particular transferable data object may represent the popularity, desirability, and/or rarity of the transferable data object, or otherwise represent a determination of how likely a transfer of a particular transferable data object is to be accepted overall. The object transferability data corresponding to a particular transferable data object may be predetermined by the transfer processing apparatus 200, user inputted, and/or derived from one or more other data elements maintained by the transfer processing apparatus 200. For example, in some embodiments, the transferability of a particular transferable data object is derived from previous generated transfers including the transferable data object and/or other transferable data objects deemed similar based on one or more shared data properties, domains, and/or the like. The transferability of a transferable data object may be indicated as greater in circumstances where a greater number of transfers for the transferable data object have been generated and/or accepted, or in circumstances where a transfers for the transferable data object or similar transferable data objects have been accepted quickly (e.g., within a shorter amount of time) as compared to other initiated transfers.

In some embodiments, the object transferability data 406 is determined and/or calculated based on various data maintained by and/or otherwise accessible to the transfer processing apparatus 200. For example, in some embodiments the object transferability data 406 comprises or embodies data representing a rarity of a transferable data object based on preference association(s) and/or availability of a transferable data object. For example, in some embodiments, the transfer processing apparatus 200 generates object transferability data 406 comprising a rarity indicator for a transferable object based on a number of available transfer object(s) of the same type or category (e.g., identifying a number of listings for the same transferable data object or similar transferable data objects) and a number of preference associations associated with such transferable data object(s). In this regard, in some such embodiments, a transferable data object that is minimally available (e.g., only one instance of the available transferable data object) but that satisfies many preference associations (e.g., is liked by many user profiles) may be associated with object transferability data that indicates greater rarity than object transferability data corresponding to a transferable data object that is more available (e.g., associated with many instances of the available transferable data object) and/or satisfies minimal preference associations (e.g., is not like by any user profile(s) and/or very few user profile(s)). It should be appreciated that, in this regard, the object transferability data 406 for a particular transferable object (and/or one or more of the other data representations depicted and/or described herein) may be calculated and/or otherwise determined based on one or more of the other data representations, and/or other data stored to, maintained by, and/or otherwise available to the transfer processing apparatus 200.

In some embodiments, object transferability data 406 influences the weight associated with whether a particular possible transfer should be provided as a preferred transfer based on one or more of the other data representations described herein. For example, in circumstances where a user profile is indicated as not an active trader (e.g., based on user activity data 414 corresponding to the user profile for example), high transferability of a transferable data object may lower the likelihood the user profile is provided the transfer (e.g., as such user profiles may be less likely to offer appropriate transfers for such a transferable data object having high transferability), or in other embodiments may increase the likelihood that the user profile is provided the transfer (e.g., as rarer transferable data objects may be of greater interest to such users).

As further illustrated, the transfer generation model 400 is configured based at least in part on object search data 408. Object search data 408 comprises data derived from previous search queries submitted and/or otherwise performed by a particular user profile associated with the transferable data object. In this regard, the object search data 408 may embody or include derived trends, patterns, and/or other information regarding the particular likes of the user profile with which such data is associated, and/or associations between transferable data objects for which the user profile has searched for previously and those currently available. In this regard, transferable data objects similar to or that satisfy the search queries previously performed by the user profile may be weighted more than transferable data objects that are unlike the previous searches of the user profile.

As further illustrated, the transfer generation model 400 is configured based at least in part on historical transfer data 410. Historical transfer data 410 comprises data embodying the initiated, accepted, declined, and completed transfers for a user profile corresponding to a particular transferable data object. In this regard, the transfer processing apparatus 200 may determine certain trends, patterns, and/or other relevant information based on such transfers. For example, the transfer generation model 400 may higher weight transferable data objects that are determined similar to those for which transfers have been initiated, accepted, and/or completed, and lower weight transferable data objects that are determined similar to those for which transfers have been declined by the user profile.

As further illustrated, the transfer generation model 400 is configured based at least in part on user history data 412. User history data 412 comprises data embodying information regarding transfers initiated by all user profiles. In this regard, the transfer generation model 400 may increase the weight of transfers that are akin to accepted and/or completed transfers performed by other user profiles, and/or lower weight transfers that are not akin to accepted and/or completed transfers or otherwise akin to declined transfers associated with other user profiles. In some embodiments, the user history data 412 comprises and/or otherwise includes some or all of the historical transfer data 410. For example, the user history data 412 may include at least the transfers particularly associated with the available transferable data object being processed.

As further illustrated, the transfer generation model 400 is configured based at least in part on user activity data 414. User activity data 414 comprises data embodying information regarding the level of transfer activity associated with a particular user profile. For example, in some embodiments, a transfer for a transferable data object that is associated with a user profile that initiates and/or completes a large volume of transfers may be higher weighted. Alternatively or additionally, in other circumstances, a transfer for a transferable data object that is associated with a user profile that is associated with a large volume of transfers may be lower weighted (e.g., in circumstances where a user profile receives and/or initiates a large number of transfers but completes only a small number of such transfers, for example under a certain threshold percentage of completed transfers).

As further illustrated, the transfer generation model 400 is configured based at least in part on blockchain activity data 416. Blockchain activity data 416 comprises data embodying information retrieved from a blockchain embodying and/or monitoring information associated with transfers, preference associations, and/or transferable data object management. The blockchain activity data 416 may include various information associated with functionality performed and/or otherwise accessed by user profile(s) via the transfer processing apparatus. Such data may include data values associated with available transferable data object(s), initiated transfer(s), accepted transfer(s), declined transfer(s), and/or completed transfer(s). In some embodiments, the transfer processing apparatus 200 stores such data to one or more blockchain(s) upon corresponding triggers and/or actions performed by the transfer processing apparatus 200 (e.g., a user marking a transferable data object as available, a transfer being generated, a user profile submitting initiation response data for a transfer, indication of a completed transfer, and/or the like).

As further illustrated, the transfer generation model 400 is configured based at least in part on locality data 418.

Locality data 418 comprises location information for one or more user profiles associated with a particular transfer, and/or location information corresponding to the transfer itself. For example, in this regard, the locality data 418 may indicate a particular transfer location where a transfer, if accepted, is to occur. Additionally or alternatively, the locality data 418 may include processed versions of such location information, for example to determine whether a particular location for a transfer is proximate to one or more of the user profile(s) involved with the transfer. The transfer generation model 400 may higher weight closer proximity transfers than transfers that are further away from a location associated with a particular user profile. In some embodiments, locality data 418 may be ignored by transfer generation model 400, for example in circumstances where no particular transfer location is associated with a transfer and transferable data objects are to be sent directly (e.g., via shipping services).

As further illustrated, the transfer generation model 400 is configured based at least in part on object comparison data 420. Object comparison data 420 comprises data representing a determined level of similarity between a particular available transferable data object and preference association(s) for a recipient user profile that is to receive the transferable data object. In this regard, transferable data objects that are exact matches of preference association(s) for the recipient user profile may be higher weighted than transferable data objects that are similar to preference association(s) for the recipient user profile. In this regard, transfers of transferable data objects that exactly match a user profile's more specific preference association may be higher weighted having an increased probability to be accepted than transferable data objects matching a more broad preference association.

As further illustrated, the transfer generation model 400 is configured based at least in part on external activity data 422. External activity data 422 comprises data representing interactions occurring on or associated with system(s) external to the transfer processing apparatus 200. In this regard, external activity data 422 may be retrieved by the transfer processing apparatus 200, for example, from one or more client device(s) and/or external activity system(s). The transfer processing apparatus 200 may retrieve, receive, collect, and/or otherwise identify such information at regular intervals, in response to particular data trigger(s) (e.g., when a user initiates and/or otherwise executes a particular application, for example a user-facing application corresponding to accessing functionality of the transfer processing apparatus 200), and/or the like. The external activity data 422 may include various particular data types based on the corresponding external activity system associated with the external activity data. For example, in one example context where the external activity data 422 comprises data associated with an external search engine system, such data may include user search queries submitted via a particular client device for processing via the external search system, search results returned by the external search system, user engagements with yielded search results in response to such search queries, and/or the like. Alternatively or additionally, for example, in some embodiments external activity data 422 comprises data associated with or embodying user engagements with electronically-served advertising content, electronically-initiated transaction(s) (e.g., purchases of items via one or more e-commerce platforms), and/or the like.

In another example context where the external activity data 422 comprises data associated with an external social media system, such data may include user posts to the social media platform, user engagements with posts on the social media platform, user connections on the social media platform, and/or the like. External activity data 422 may be processed, alone or in conjunction with one or more of the other data representations depicted and/or described herein, to identify one or more data patterns, trends, and/or the like associated with a particular user profile. By processing the external activity data 422, both information generated based on a user's activities performed via a transfer processing system and information generated based on user's activities performed via other, external systems may each be utilized to generate preference association(s) for a user profile, preferred transfers for the user profile and another user profile where the available transferable data objects for each user profile includes a match (e.g., a first transferable data object associated with a first transferable data object satisfying a second user profile's preference association(s) and a second transferable data object associated with a second user profile satisfying a first user profile's preference association(s)), and/or the like.

As further illustrated, the transfer generation model 400 is configured based at least in part on user preferences data 424. User preferences data 422 comprises data representing aspect(s), data characteristic(s), and/or the like for transferable data object(s) that are probable to be preferred for a particular user profile. In this regard, the transfer generation model 400 may determine that transfers including transferable data objects preferred by the particular user profile are more probable to be accepted. In some embodiments, the user preferences data 422 includes one or more data characteristics utilized to filter transferable data objects that are associated with such data characteristic(s), and/or filter transferable data objects that are not associated with such data characteristic(s). Alternatively or additionally, in some embodiments, the user preferences data includes explicit user preferences provided via user input, for example indicating particular preferred transferable data object(s) and/or preferred data characteristic(s) for transferable data objects. In some embodiments, the user preferences data 422 includes the preference association(s) associated with the user profile. In one example context, data representing the transferable data object(s) "liked" by the user profile are processed to determine preferred transfer(s) based at least in part on such liked transferable data objects.

It should be appreciated that the transfer generation model 400 may take as input any one or more of the data representations 402-424. In some embodiments, the transfer generation model 400 may be configured and/or trained such that each input is weighted in a manner that accurately reflects its predicted effect on the likelihood the recipient user accepts the transfer. In this regard, the transfer generation model 400 may process any combination of such data representations to identify and/or output the preferred transfer(s) that satisfy applicable preference association(s) for each user profile involved in the transfer and that have the highest likelihood of being accepted and/or completed.

Example Process Flowcharts of the Disclosure

Referring to FIG. 5 and FIG. 6, a flowchart illustrating exemplary operations of a transfer processing system 102, for example embodied by the transfer processing apparatus 200, and an example data flow 500 attributable to generating a transfer is provided. The operations described in connection with FIG. 6 may, for example, be performed by one or more components described with reference to transfer processing apparatus 200 shown in FIG. 2 (e.g., by or through the use of one or more of processor 202, memory 201, input/output circuitry 203, communications circuitry 206, transfer management circuitry 204, user management circuitry 205, any other suitable circuitry, and any combination thereof); by any other component described herein; or by any combination thereof.

The processes described herein may each be embodied as a computer-implemented process. Additionally or alternatively, in some embodiments, each computer-implemented process is embodied by computer program code stored on a non-transitory computer-readable storage medium of a computer program product configured, in execution for example with at least one processor, to perform the computer-implemented method. Alternatively or additionally, in some embodiments, the computer-implemented processes described herein may each be performed by one or more specially configured computing devices, such as the transfer processing apparatus 200. In this regard, in some such embodiments, the transfer processing apparatus 200 is specially configured by computer program instructions stored thereon, for example in the memory 201 and/or another components depicted and described herein, and/or otherwise accessible to the transfer processing apparatus 200, for performing the operations as depicted and described. In some embodiments, the transfer processing apparatus 200 includes and/or otherwise is in communication with one or more external apparatuses, systems, devices, and/or the like, to perform one or more of the operations as depicted and described. For example, the transfer processing apparatus 200 may include and/or communicate with one or more external computing devices, such as client device(s) associated with various user profile(s), to perform one or more of the operations.

In exemplary data flow 500, at block 501, a client device 107A receives user input for a new preference association and generates a preference association input data object. The preference association input data object may indicate a particular target transferable data object, target category of transferable data object, target classification of transferable data object, and/or other target data comparable with transferable data object(s) to determine satisfying transferable data objects that the user likes and/or otherwise would like to obtain via transfer. In some embodiments, at block 502, the client device 107A transmits the preference association input data object to the transfer processing apparatus 200. The preference association input data object is received at block 503 by the transfer processing system 102.

In some embodiments, at block 504, the transfer processing system 102, generates a preference association table entry. In some embodiments, the preference association table includes information based on the preference association input data object about the target transferable data object and/or other information regarding a particular target transferable data object. For example, in circumstances where a user profile generates a preference association for a particular target transferable data object currently associated with a particular user profile (e.g., that owns the transferable data object), the preference association table may include information regarding the transferable data object (e.g., the item for transfer), the recipient user profile, and/or the sender user profile.

In some embodiments, the transfer processing system 102 automatically generates preference association(s) for one or more users, for example without user input explicitly expressing a preference association. For example, in some embodiments, the transfer processing system 102 is configured to process stored data and/or received data associated with a particular user profile to generate preference association(s) for the user profile. In this regard, the transfer processing system 102 may identify particular data trends based on input data, such as the data representations depicted in FIG. 4, and utilize such data trends to identify and generate data association(s) for particular transferable data objects, categories of transferable data objects, and/or the like. It should be appreciated that in some embodiments, the transfer processing system 102 includes or otherwise maintains one or more specially configured model(s) (e.g., algorithmic, machine learning, and/or statistical models) configured to generate such preference association(s) for such user profile(s), for example the transfer generation model 400 as depicted and described herein. For example, the transfer processing system 102 may determine, based on the various data collected for and/or otherwise identified as associated with the user profile, that the user profile is likely to accept transfer(s) for particular transferable data object(s) based on inferred associations with such data, and/or based on data trends for historical transfers performed by other user profile(s) having the same and/or similar associated data. Such determinations may similarly include various vertical(s) for transferable data objects, for example where user profiles that perform transfers for transferable data objects associated with a first vertical are determined to commonly accept, initiate, and/or otherwise complete transfers within a second vertical of transferable data object(s).

In some embodiments, at block 505A, the transfer processing system 102, process transferable data object data. In some embodiments, the transferable data object data includes any of a myriad of data and/or information embodied by, derived from, or associated with a particular transferable data object. In some embodiments, the transferable data object data may comprise data indicating whether the transferable data object is listed in any pending or completed transfer. In some other embodiments, transferable data object data may comprise transferable data object detail data, for example an object description or object condition automatically determined or inputted by a user.

In some embodiments, at block 505B, the transfer processing system 102, processes user preference data. In some embodiments, the user preference data may comprise other data preferences set associated with the user profile for generating and/or accepting transfer(s), such as a maximum object resource value differential, a particular transfer location or proximity threshold, and/or the like. In some embodiments, the user preference data may comprise a transfer history for one or more user profiles, including trading in verticals. For example, processing user preferences data may enable the transfer processing apparatus 200 to determine that user profiles that like and/or have transferred for a first transferable data object (e.g., item A), tend to like and/or transfer for a second transferable data object (e.g., item B). Alternatively or additionally, processing user preferences data may enable the transfer processing apparatus 200 to determine that user profiles that typically complete transfers for transferable data objects within vertical C also tend to complete transfers for transferable data objects within vertical D. Such determinations of transfers for particular transferable items that are likely to be accepted based on such data may be generated by one or more algorithmic, statistical, and/or machine learning models specially configured to perform such determinations accurately based on the particular input data. For example, the transfer processing apparatus 200 may maintain and/or otherwise configure the algorithmic, statistical, and/or machine learning model(s) based on any of the data accessible to and/or stored by the transfer processing apparatus 200, for example to train such models to accurately predict the transfers to be accepted by user profiles associated with particular data.

In some embodiments, the user preference data comprises a quality score that can be adjusted based on the experience of the user profile with performing transfers. In some embodiments, the experience of the user profile comprises, or is based at least in part on, past transfer history. In some embodiments, past transfer history comprises information for completed transfers, and/or information for initiated but not completed transfers. In some embodiments, past transfer history comprises declined transfers.

In some embodiments, at block 505C, the transfer processing system 102, analyzes object resource value data for a transferable data object. One such example of information embodied by or included in the object resource value data comprising pricing data for a particular transferable data object. In some embodiments, the price of a transferable data object is the price inputted by the user corresponding to the user profile associated with the transferable data object. In some embodiments, the price is determined by the average price of all listings of the transferable data object. In other embodiments, the price is automatically determined for a transferable data object, for example utilizing one or more object resource value generation algorithm(s) as described herein.

In some embodiments, at block 505D, the transfer processing apparatus 200 generates a sorted list of available transferable data objects satisfying the preference association. In embodiments, the sorted list comprises sender user profiles and recipient user profiles associated with transferable data objects that are proximate to one another based on object resource value(s) and/or other metrics. In some embodiments, "close proximity" with respect to a particular object resource value means values within a determined threshold range from one another. For example, in the context of an object resource value embodying a price for a product, products with price+/−$10 from one another may be determined within close proximity. In some embodiments, close proximity means transferable data objects associated with object resource values that have range between a maximum of 20-30% of one another.

In some embodiments, at block 506A, the transfer processing apparatus 200 determines a match between a recipient user profile and a sender user profile and generates an offer data object. The match may indicate that the sender user profile is associated with a transferable data object that satisfies preference association(s) for the recipient user profile, and/or similarly that the recipient user profile is associated with a transferable data object that satisfies preference association(s) for the sender user profile. Additionally or alternatively, the match may be determined based on satisfying other user preferences, such as location proximity requirements and/or resource value proximity requirements. In some embodiments, a match is determined based on satisfying price proximity ranges set by the users of the user profiles. Additionally or alternatively, in some embodiments, a match is determined based on a default price proximity. In some other embodiments, a match comprises an exact price match for transferable data objects to be transferred between one or more user profiles.

In some circumstances, a match is determined based on any combination of a myriad of data associated with transferable data object(s) to be transferred and/or user profile data associated with the user profiles corresponding to the transfer. In this regard, for example, a match may be identified based on object resource values for two or more transferable data objects involved in linked transfer(s), locality proximity data between user profiles associated with the linked transfer(s), object preferences determined for each of the user profile(s) (e.g., data processed to determine the first transferable data object to be transferred to a first user profile is highly sought after by the first user profile and thus the transfer should be greater weighted/preferred, and data processed to determine the second transferable data object is less sought after by the second user profile and thus the transfer should be less weighted/preferred), and/or the like In embodiments, at block 506B, the transfer processing apparatus 200 generates a transfer data object and adds the transfer data object to a transfers table. The transfers table may be maintained associated with the specific transferable data object to be transferred, such that the transfers initiated, accepted and/or declined, and/or completed are maintained separately for each particular transferable data object. In other embodiments, a single transfers table includes entries corresponding to transfers for multiple transferable data objects.

In some embodiments, at block 507A-B, the transfer data object may be transmitted to two or more client devices, such as the client devices 107A and 107B. The transfer data object is received by one or more client devices 107A and/or 107B at blocks 508A and/or 508B, respectively. Client devices 107A and 107B receive user acceptance input data or user declination input data, indicating acceptance or declination of the transfer offered to the user, and generate an accepting or declining data object at blocks 509A and 509B in response to said user input data. In some embodiments, at blocks 510A and 510B respectively, the client devices 107A and 107B transmit the accepting or declining data object to transfer processing apparatus 200. Transfer processing apparatus 200 receives the accepting or declining data object from each of the two or more client devices 107A and 107B at block 511A.

In some embodiments, at block 511B, the transfer processing apparatus 200 determines a positive or negative match of the accepting or declining data objects received from each of the client devices. If a positive match is determined (e.g., both received responses are accepting data objects), an acceptance of the transfer data object is generated at block 511C. The acceptance of the transfer data object, or an indication or other notification thereof, is transmitted at blocks 512A and 512B respectively to each of the two or more client devices 107A and 107B. Client devices 107A and 107B receive the indication of the acceptance of the transfer data object at blocks 513A and 513B respectively.

In some embodiments, the transferable data object is removed from association with the sender user profile at block 620 of FIG. 6. Additionally or alternatively, in circumstance where a positive match of acceptance of the transfer is determined, the transferable data object may be associated with the recipient user profile. The transfer processing apparatus 200 may alter the association of the transferable data object in an object repository, and/or sub-repository thereof such as an object availability repository. In circumstances where a negative match is determined, a declination of the transfer data object is generated at 511C. The declination of the transfer data object is transmitted at blocks 514A and 514B respectively to two or more client devices associated with the declined transfer data object, such as client device 107A and client device 107B as illustrated. Client devices 107A and 107B each receive the declination of the transfer data object at blocks 515A and 515B, respectively.

In some embodiments, the object repository 105 comprises a main catalog of available transferable data objects. In some embodiments, after receiving preference association input object data at block 503, the transfer processing apparatus 200 queries the main catalog of available transferable data objects in the object repository 105 for all associated child transferable data objects at block 610 of FIG. 6. In embodiments, the transfer processing apparatus 200 may further create a preference association and/or corresponding entry in a preference associations table for each child transferable data object associated with the user profile that initiated the input.

FIG. 7 illustrates a flowchart illustrating exemplary operations of a computer-implemented process for generating and/or facilitating preferred transfer(s) in accordance with at least some example embodiments of the present disclosure. Specifically, FIG. 7 depicts an example process 700 for generating and/or facilitating multi-way transfer(s) between a plurality of user profiles.

The process 700 begins at operation 702. At operation 702, the transfer processing apparatus includes means, such as the transfer management circuitry 204, user management circuitry 205, communications circuitry 206, input/output circuitry 203, processor 202, and/or the like, or a combination thereof, to receive an indication of a preference association with a particular transferable data object. In this regard, the indication may be received in response to user input via a client device. The client device may be associated with a particular authenticated session granting access to functionality of the transfer processing apparatus 200 for a particular user profile, for example a user profile for which the user has entered valid authentication credentials to initiate the authenticated session. The preference association may indicate or be associated with a particular target transferable data object liked or otherwise desired by the particular user profile to be obtained via transfer.

At operation 704, the transfer processing apparatus includes means, such as the transfer management circuitry 204, user management circuitry 205, communications circuitry 206, input/output circuitry 203, processor 202, and/or the like, or a combination thereof, to determine whether the target transferable data object corresponding to the preference association received at operation 702, for example, is a catalog object. A catalog object may embody a transferable data object that includes or is associated with any number of child transferable data objects and/or associated transferable data objects. For example, in some embodiments, a transferable data object may be indicated unique, such that a preference association associated with the transferable data object corresponds to only the particular transferable data object. In some embodiments, a transferable data object includes or is associated with one or more data properties that indicate whether a transferable data object is a catalog object or not a catalog object. In circumstances where a transferable data object is indicated as a catalog object, a preference association may be generated for the transferable data object and/or all other instances of the same transferable data object, associated transferable data object(s), and/or sub-transferable data objects.

In some embodiments, a preference association generated associated with a catalog object comprises a "hidden preference association." In this regard, hidden preference associations may not be displayed via one or more user interfaces associated with the user profile. Such hidden preference associations may be utilized to efficiently identify matches between user profiles associated with transferable data objects that satisfy one preference associations for each user profile. For example, when a user corresponding to a first user profile indicates a preference association for a particular catalog object, hidden preference associations may be generated for each other instance of the transferable data object in an object repository that is associated with a different user profile, for example. In this regard, the transfer processing apparatus 200 may quickly identify appropriate transfers for generating based on a match between the first user profile and the other user profile in a circumstance where the other user profile indicates a preference association for a transferable data object associated with the first user profile.

In a circumstance where the transferable data object is a catalog object, flow continues to operation 706. In a circumstance where the transferable data object is not a catalog object, flow continues to operation 710, as described below.

At operation 706, the transfer processing apparatus includes means, such as the transfer management circuitry 204, user management circuitry 205, communications circuitry 206, input/output circuitry 203, processor 202, and/or the like, or a combination thereof, to identify child transferable data objects linked to the selected transferable data object. In some embodiments, the selected transferable data object (e.g., the transferable data object for which a preference association was received at operation 702) may include or be associated with data identifying each child transferable data object linked to the selected transferable data object, such as the object identifier for each child identifier. Alternatively or additionally, in some embodiments, each transferable data object includes one or more identifiers embodying a parent transferable data object for which the transferable data object is linked as a child.

At operation 708, the transfer processing apparatus includes means, such as the transfer management circuitry 204, user management circuitry 205, communications circuitry 206, input/output circuitry 203, processor 202, and/or the like, or a combination thereof, to generate a preference association for each transferable data object linked to the selected transferable data object. In some such embodiments, the transfer processing apparatus 200 generates an entry to a preference associations table for a preference association for each child transferable data object.

At operation 710, the transfer processing apparatus includes means, such as the transfer management circuitry 204, user management circuitry 205, communications circuitry 206, input/output circuitry 203, processor 202, and/or the like, or a combination thereof, to determine whether a transferable data object is indicated available. In this regard, the transfer processing apparatus 200 may query an object availability repository including available transferable data objects to determine whether the transferable data object exists in the repository. In circumstances where the transferable data object is identified as available within such a repository, flow may proceed to operation 714, in circumstances where the transferable data object is not identified as available within such a repository, flow continues to operation 712.

At operation 712, the transfer processing apparatus includes means, such as the transfer management circuitry 204, user management circuitry 205, communications circuitry 206, input/output circuitry 203, processor 202, and/or the like, or a combination thereof, to cause rendering of a transferable data object unavailable message. The transfer processing apparatus 200 may cause rendering of a transferable data object unavailability message to a client device associated with the user profile that generated the preference association, for example the client device from which the indication of the preference association was received at operation 702. The transferable data object unavailability message may include one or more interface elements, such as text, image, video, audio, and/or other interface elements, that indicate the transferable data object is not available in the object repository.

At operation 714, the transfer processing apparatus includes means, such as the transfer management circuitry 204, user management circuitry 205, communications circuitry 206, input/output circuitry 203, processor 202, and/or the like, or a combination thereof, to determine whether the available data object is associated with object resource value data. In some embodiments, the object resource value data represents a price for the associated available transferable data object. The object resource value data may have been previously associated with the transferable data object by a user profile currently associated with the transferable data object, and/or may have been automatically determined and associated with the transferable data object by the transfer processing apparatus 200. In circumstances where object resource value data is determined not associated with the available transferable data object, flow continues to operation 716. Otherwise, in circumstances where object resource value data is determined associated with the available transferable data object, flow continues to operation 720.

At operation 716, the transfer processing apparatus includes means, such as the transfer management circuitry 204, user management circuitry 205, communications circuitry 206, input/output circuitry 203, processor 202, and/or the like, or a combination thereof, to generate the object resource value data for the available transferable data object. The object resource value data may be generated utilizing any of a myriad of processes. For example, in some embodiments, the transfer processing apparatus 200 generates the object resource value data utilizing one or more object resource value generation model(s) and/or algorithm(s), as described herein. The transfer processing apparatus 200 may generate the object resource value data by processing other data for users, transfers, transferable data object(s), and/or a combination thereof, made available to the transfer processing apparatus 200. A non-limiting example algorithm for generating object resource value data for a particular transferable data object is depicted and described herein with respect to FIG. 8.

At operation 718, the transfer processing apparatus includes means, such as the transfer management circuitry 204, user management circuitry 205, communications circuitry 206, input/output circuitry 203, processor 202, and/or the like, or a combination thereof, to associate the object resource value data with the available transferable data object. In this regard, the object resource value data may be assigned or otherwise "set" as a value for a particular data property of the available transferable data object that represents the resource value for the transferable data object. Additionally or alternatively, in some embodiments, the object resource value data is embodied by a second data object associated with the available transferable data object.

At operation 720, the transfer processing apparatus includes means, such as the transfer management circuitry 204, user management circuitry 205, communications circuitry 206, input/output circuitry 203, processor 202, and/or the like, or a combination thereof, to generate an entry in a preference associations table that corresponds to the generated preference association. The entry in the preference association table may indicate at least the transferable data object for which the user would like to receive. In some embodiments, the entry in the preference association table additionally or alternatively indicates the recipient user profile (e.g., the user profile that likes the available transferable data object and wants to receive it) and/or sender user profile associated with the available transferable data object (e.g., the user profile that is currently associated with the available transferable data object as the owner). It should be appreciated that, in some embodiments, additional and/or alternative data may similarly be included in the entry, such as object resource value data for the available transferable data object, locality information for the recipient user profile and/or the sender user profile, proximity threshold information (e.g., location proximity thresholds and/or object resource value proximity thresholds), and/or the like.

At operation 722, the transfer processing apparatus includes means, such as the transfer management circuitry 204, user management circuitry 205, communications circuitry 206, input/output circuitry 203, processor 202, and/or the like, or a combination thereof, to fetch a sorted list meeting user preferences. The sorted list of sender user profile and recipient user profile may include available transferable data objects that satisfy the preference associations, as indicated by the entries in the preference associations table. In this regard, the list may be sorted based on one or more thresholds, such as proximity thresholds for object resource value and/or locality for the user profiles. For example, the sorted list may be based on a price proximity range applied for a particular user profile or for all user profiles.

At operation 724, the transfer processing apparatus includes means, such as the transfer management circuitry 204, user management circuitry 205, communications circuitry 206, input/output circuitry 203, processor 202, and/or the like, or a combination thereof, to determine whether the sorted lists are equivalent. In this regard, the transfer processing apparatus 200 may determine whether a sorted list for a recipient user profile and a second sorted list for a sender user profile are equivalent. In circumstances where the sorted lists are equivalent (e.g., the top sorted transferable data object for each user profile is from the other user profile) a match is determined and flow proceeds to operation 726. If the sorted lists are not equivalent, a match is not determined and flow returns to operation 702 to restart the process.

At operation 726, the transfer processing apparatus includes means, such as the transfer management circuitry 204, user management circuitry 205, communications circuitry 206, input/output circuitry 203, processor 202, and/or the like, or a combination thereof, to provide a transfer request notice for each user profile associated with matching sorted lists. In this regard, the transfer request notice may indicate the transferable data objects to be received and sent for each user profile. In some embodiments, for example, the transfer processing apparatus 200 provides a transfer request notice to a client device associated with each user profile. The transfer request notice may indicate that the user profiles have been matched for a generated transfer, and/or cause the client devices to render relevant interfaces for accepting and/or denying the generated transfer.

At operation 728, the transfer processing apparatus includes means, such as the transfer management circuitry 204, user management circuitry 205, communications circuitry 206, input/output circuitry 203, processor 202, and/or the like, or a combination thereof, to generate an entry in a transfers table. The new entry embodies the newly identified transfer for matched user profiles, such that the transfer processing apparatus 200 may track outstanding transfers as users interact with them. For example, the entry may be generated with a pending status corresponding to each user profile, and such a status may be updated as users interact with the transfer (e.g., by accepting and/or declining as described herein). The transfer processing apparatus 200 may update the entry as response data is received associated with each user profile, and decline the transfer in a circumstance where one or more user profiles decline the transfer, or initiate completion of the transfer in circumstances where each user profile associated with the transfer accepts.

FIG. 8 illustrates a flowchart illustrating exemplary operations of a computer-implemented process for associating object resource value data to a transferable data object, in accordance with at least some example embodiments of the present disclosure. Specifically, FIG. 8 depicts an example process 800 for generating and associating object resource value data to a transferable data object.

The process 800 begins at operation 802. At operation 802, the transfer processing apparatus includes means, such as the transfer management circuitry 204, user management circuitry 205, communications circuitry 206, input/output circuitry 203, processor 202, and/or the like, or a combination thereof, to identify transferable data object detail data for a transferable data object associated with a sender user identifier. The transferable data object detail data may include any number of data values for data properties associated with the transferable data object. Non-limiting examples may include an object condition, object type, object category, object domain, object description, object images, and/or the like.

In some embodiments, the transferable data object detail data includes user-inputted object resource value data. In one example context, the user-inputted object resource value data embodies a user-inputted object resource value data to be associated with a transferable data object. The user-inputted object resource value data may be publicly made available to other user profiles during browsing and/or searching for available transferable data objects for transfers. The user-inputted object resource value data may be compared to object resource value data determined via the system, as described herein, to determine whether the user-inputted object resource value data should be adjusted or supplanted, for example as exceeding a particular threshold differential to the object resource value data determined via the system, and/or to provide to notice to user profiles in circumstances where such a differential exceeds a particular threshold differential, thus decreasing the probability that a transfer associated with the transferable object being accepted by the user profile embodying recipient of the transferable data object corresponding to the user-inputted object resource value data.

At operation 804, the transfer processing apparatus includes means, such as the transfer management circuitry 204, user management circuitry 205, communications circuitry 206, input/output circuitry 203, processor 202, and/or the like, or a combination thereof, to initiate an object resource value data generating API. In some embodiments, the object resource value data generating API outputs an initial object resource value for transferable data objects that have been previously processed. In some embodiments, the object resource value data generating API additionally takes as input one or more details associated with the transferable data object, for example an object condition (new or used, condition levels, and/or the like).

The object resource value data generating API may be embodied by and/or involve communication with one or more APIs controlled by and/or otherwise associated with one or more external systems. Such external systems may include or otherwise similarly process and/or generate object resource value data corresponding to one or more representations of transferable objects. For example, in some embodiments, the object resource value generating API communicates with one or more e-commerce and/or C2C transfer platforms that manage and/or include listings of transferable data objects and associated object resource value data (e.g., price data in one example context) for such transferable data objects. In this regard, the object resource value data generating API may be leveraged to attempt to identify object resource value data corresponding to a particular transferable data object provided by one or more of such external systems based on data submitted to and/or maintained by such systems. Leveraging such external systems may improve the accuracy of determinations performed by the transfer processing apparatus 200 for determining an appropriate object resource value data for the transferable data object.

At operation 806, the transfer processing apparatus includes means, such as the transfer management circuitry 204, user management circuitry 205, communications circuitry 206, input/output circuitry 203, processor 202, and/or the like, or a combination thereof, to determine whether API data for the transferable data object is found. The transfer processing apparatus 200 may perform such a determination based on whether use of the object resource value data generating API provides any result data. In circumstances where the transfer processing apparatus 200 identifies API data for the transferable data object representing object resource value data for the transferable data object, flow proceeds to operation 814. In circumstances where the transfer processing apparatus 200 does not identify API data for the transferable data object representing object resource value data for the transferable data object, flow proceeds to operation 808. In one example context, API data for the transferable data object is found in circumstances where the object resource value data generating API provides results data associated with object resource value data from one or more external systems, and is not found in circumstances where results data is not provided or empty.

At operation 808, the transfer processing apparatus includes means, such as the transfer management circuitry 204, user management circuitry 205, communications circuitry 206, input/output circuitry 203, processor 202, and/or the like, or a combination thereof, to access a transferable object blockchain to validate object resource value data based on the transferable data object detail data. For example, the blockchain may be queried for particular data based on the transferable data object detail data for the transferable data object (e.g., the same transferable data object, similar transferable data objects, other qualities of the same transferable data object, and/or the like) and retrieve previously associated object resource value data for transferable data objects represented in the blockchain.

In some embodiments, the blockchain (or blockchain(s)) is configured to store various records indicating object resource value data assigned to or otherwise associated with transferable data object(s) at various time intervals during the lifecycle of a transfer. For example, in some embodiments the blockchain(s) include data records indicating user-assigned object resource value data at the time the transferable data object is made available by the corresponding user profile (e.g., and a listing or page associated with the transferable data object is made accessible to other user profiles for purposes of generating transfers involving the transferable data object), upon initiation of a transfer, and/or upon completion of a transfer. In this regard, the blockchain may be queried to determine historical object resource value data for the transferable data object and/or similar transferable data object(s) based on such data within the blockchain(s). In some embodiments, for example, an average object resource value is determined based on the historical data retrieved and processed from the blockchain(s).

At operation 810, the transfer processing apparatus includes means, such as the transfer management circuitry 204, user management circuitry 205, communications circuitry 206, input/output circuitry 203, processor 202, and/or the like, or a combination thereof, to determine the object resource value data and validity of said object resource value data. For example, in some embodiments, the transfer processing apparatus 200 utilizes the data retrieved from the blockchain to determine the object resource value data for the transferable data object. In this regard, the determined object resource value data may be determined within a particular desired range, determined consistent with historical object resource values for the transferable data object and/or similar transferable data objects (e.g., within a particular differential from an average price, and/or adjusted based on object detail data such as an object quality and/or the like). In some embodiments, the transfer processing apparatus 200 determines a validity corresponding to the object resource value data determined. The validity may represent a determined confidence interval, probability that the value is accurate, and/or other measure of accuracy based on one or more factors associated with the determined object resource value data. For example, in some embodiments, the validity corresponding to determined object resource value data is generated and/or otherwise determined based on the robustness and/or availability of historical object resource value data from the blockchain (e.g., a number of records retrieved from the blockchain and utilized to determine the object resource value data, whether such a number of records satisfies a confidence threshold such as a minimum number of records to process, and/or the like). It should be appreciated that one or more confidence algorithm(s) may be implemented to determine the validity corresponding to a particular object resource value data.

At operation 812, the transfer processing apparatus includes means, such as the transfer management circuitry 204, user management circuitry 205, communications circuitry 206, input/output circuitry 203, processor 202, and/or the like, or a combination thereof, to finalize the object resource value data.

In some embodiments, for example, the object resource value data may be adjusted based on particular portions of the object detail data for the transferable data object, such as an object condition. Alternatively or additionally, the object resource value data may be adjusted based on existing instances of similar or the same transferable data object currently available via the system. For example, in some embodiments, the object resource value data to be associated with the transferable data object embodies a user-inputted object resource value data, and a differential to the determined object resource value data is associated with the transferable data object additionally (or alternatively, in some embodiments). In this regard, the differential between the user-inputted object resource value data and the determined object resource value data may be utilized to alter the associated object resource value data, determine which other transferable data objects corresponding to initiated transfers are likely to be accepted in exchange for the transferable data object (e.g., transferable data objects that have a determined differential to the corresponding object resource value data determinable via the blockchain that is similar to the differential determined for the transferable data object being processed), and/or the like. In some embodiments, The finalized object resource value data to be associated with the transferable data object is not adjusted, for example in circumstances where the differential between a user-inputted object resource value data is within a determined acceptable range from the determined object resource value data from the blockchain, or in circumstances where no user-inputted object resource value data is present.

Returning to operation 814, at operation 802, the transfer processing apparatus includes means, such as the transfer management circuitry 204, user management circuitry 205, communications circuitry 206, input/output circuitry 203, processor 202, and/or the like, or a combination thereof, to parse the API response and validate against object resource value data for transferable data object associated with the sender user identifier. In this regard, the transfer processing apparatus 200 may parse the API response to determine object resource value data proposed by the API for the transferable data object. The transfer processing apparatus 200 may compare the API proposed object resource value data with user-submitted object resource value data received from the sender user profile (e.g., a user-inputted price). In circumstances where the user-submitted object resource value data is validated (e.g., falls within a particular threshold range from the API provided object resource value data), the user-submitted object resource value data may be associated with the transferable data object, for example at operation 816 as described herein. Alternatively, if the user-submitted object resource value data is not validated (e.g., falls outside of a particular threshold range from the API provided object resource value data), then the API provided object resource value data may be associated with the transferable data object. Alternatively, the transfer processing apparatus 200 may transmit one or more notifications recommending the API provided object resource value data to the user and enable the user to select whether to keep their submitted resource value or update to the API provided resource value.

At operation 816, the transfer processing apparatus includes means, such as the transfer management circuitry 204, user management circuitry 205, communications circuitry 206, input/output circuitry 203, processor 202, and/or the like, or a combination thereof, to associate the object resource value data with the transferable data object associated with the sender user identifier. In some embodiments, the object resource value data may be stored as a data property of the transferable data object. In other embodiments, one or more entries are updated to include the object resource value data corresponding to the transferable data object. In this regard, the object resource value data associated with the transferable data object may be subsequently identified and/or further processed, for example as described herein with respect to FIG. 7 and/or FIG. 9.

In some embodiments, the object resource value data determined by the transfer processing apparatus is associated with the transferable data object such that the data adjusts or supplants any user-inputted object resource value data (if any was provided). In other embodiments, the object resource value data determined is utilized to determine a differential between the object resource value data determined via the transfer processing apparatus 200 and/or process the differential further. For example, in some embodiments, in a circumstance where the differential exceeds a threshold differential, the transfer processing apparatus 200 may notify the user and/or provide access to functionality to either keep the user-inputted object resource value data, adjust the user-inputted object resource value data, supplant the user-inputted object resource value data with the determined object resource value data, and/or the like. Alternatively or additionally, in some embodiments, the differential is associated with the transferable object and utilized to determine whether transfers associated with other available transferable data objects are likely to be accepted by the user. For example, the differential may be compared to the differential for another transferable data object offered for transfer, and in circumstances where the transfer for the transferable data object to be received by the user is lesser than the differential for the transferable data object being offered, the transfer may be higher weighted). It should be appreciated that the user-inputted object resource data value, the determined object resource value data, and/or the differential associated therewith may be processed alone or in conjunction to perform any number of determinations and/or assign weights to possible transfers, for example by a transfer optimization model as described herein during selection of preferred transfers for providing to a user profile.

FIG. 9 illustrates a flowchart depicting example operations of another computer-implemented process for generating and/or facilitating preferred transfer(s) in accordance with at least some example embodiments of the present disclosure. Specifically, FIG. 9 depicts an example process 900 for generating a transfer associated with any number of user profiles.

The process 900 begins at operation 902. At operation 902, the transfer processing apparatus includes means, such as the transfer management circuitry 204, user management circuitry 205, communications circuitry 206, input/output circuitry 203, processor 202, and/or the like, or a combination thereof, to receive user input data indicating a first preference association for a first target transferable data object. In some embodiments, the first preference association specifically identifies the first target transferable data object, and in some contexts an associated sender user profile. In other embodiments, the first preference association identifies a category and/or classification of object, such that all available transferable data objects in the category and/or classification of object satisfy the preference association. In yet some other embodiments, the preference association corresponds to a catalog object associated with one or more child objects, such that a preference association is generated associated with each child object of the transferable data object. The user input data may be received in response to one or more user interactions, for example performed via a client device associated with a first user profile corresponding to a first user profile identifier.

At operation 904, the transfer processing apparatus includes means, such as the transfer management circuitry 204, user management circuitry 205, communications circuitry 206, input/output circuitry 203, processor 202, and/or the like, or a combination thereof, to generate a first entry in a preference associations table. The first entry embodies the first preference association corresponding to the first user profile identifier. In this regard, the transfer processing apparatus 200 may process data (e.g., available transferable data objects) to attempt to satisfy the preference association entered to the preference associations table in subsequent operations.

At operation 906, the transfer processing apparatus includes means, such as the transfer management circuitry 204, user management circuitry 205, communications circuitry 206, input/output circuitry 203, processor 202, and/or the like, or a combination thereof, to identify at least one transferable data object associated with the first user profile identifier. The at least one transferable data object embodies a user-associated available transferable data object with respect to the first user profile identifier, for which transfers are being generated. In some embodiments, the transfer processing apparatus 200 maintains an object repository that associates transferable data objects with a particular user profile representing the transferable data object's current owner (e.g., a user that may transfer the object). In this regard, the transfer processing apparatus 200 may query the object repository based on the first user profile identifier for user-associated available transferable data objects associated with the first user profile identifier. In some embodiments, the transfer processing apparatus 200 iterates through all transferable data objects associated with the first user profile and attempts to identify satisfying transfers for such transferable data objects (e.g., transfers that provide the transferable data object to another user and receive a different transferable data object that satisfies one or more preference associations for the first user profile identifier).

At operation 908, the transfer processing apparatus includes means, such as the transfer management circuitry 204, user management circuitry 205, communications circuitry 206, input/output circuitry 203, processor 202, and/or the like, or a combination thereof, to identify at least one transfer of at least one available transferable data object that satisfies the first preference association corresponding to the first user profile identifier. The transfer processing apparatus 200 may attempt to identify an available transferable data object associated with a second user profile identifier, where the available transferable data object satisfies the preference association associated with the first user profile identifier, and where the at least one transferable data object associated with the first user profile identifier satisfies a second preference association corresponding to the second user profile identifier. In circumstances where such a transfer cannot be identified, the transfer processing apparatus 200 may increase the number of transfers attempted, for example by one, and subsequently attempt a transfer including an increased number of user profiles based on the updated number of transfers (e.g., starting with a two-way transfer, then a three-way transfer, and so on). The transfer processing apparatus 200 may identify a satisfactory transfer in a circumstance where each user profile is associated with an available transferable data object that satisfies a preference association for another user profile, such that each user profile is a sender user profile and recipient user profile for at least one portion (e.g., a sub-transfer) of the transfer.

At operation 910, the transfer processing apparatus includes means, such as the transfer management circuitry 204, user management circuitry 205, communications circuitry 206, input/output circuitry 203, processor 202, and/or the like, or a combination thereof, to select a preferred one or more transfers of the at least one transfer. The preferred one or more transfers may minimize and/or maximize particular data values and/or parameters associated with such transfers. For example, in some embodiments, the preferred one or more transfers are selected that minimize a differential between the object resource value data for each transferable data object associated with the transfer, and/or that minimize a proximity between user profiles associated with each transfer. In other embodiments, a preferred one or more transfers may be based on any of a myriad of user preferences.

In some embodiments, the transfer processing apparatus 200 is configured to utilize a transfer optimization model to generate transfer preference ranking data for each transfer of the at least one transfer. The transfer optimization model may comprise one or more algorithmic, statistical, and/or machine learning models configured to generate transfer preference ranking data for a transfer that represents the likelihood a particular transfer will be accepted by one or more user profile(s). In some embodiments, the transfer optimization model is trained to generate the preference ranking data based at least in part on one or more data properties, such as user preferences, locality proximity thresholds for the one or more user profiles, object resource value differential thresholds for the one or more user profiles, and/or the like. In this regard, the transfer processing apparatus 200 may select the preferred one or more transfers based at least in part on the transfer preference ranking data. In some embodiments, for example, the transfer processing apparatus 200 selects the one or more transfers having the highest transfer preference ranking data as the preferred one or more transfers.

It should be appreciated that, in some embodiments, the transfer processing apparatus 200 trains and/or otherwise configures the transfer optimization model, for example based on any of the data available to the transfer processing apparatus 200 (e.g., user profile data, transferable data object data, historical transfer data, and/or the like). In other embodiments, the transfer processing apparatus 200 receives a trained and/or configured transfer optimization model from another system, for example an external system that stores and/or trains the transfer optimization model, to reduce the computing resources required by the transfer processing apparatus 200 to operate the transfer optimization model.

At operation 912, the transfer processing apparatus includes means, such as the transfer management circuitry 204, user management circuitry 205, communications circuitry 206, input/output circuitry 203, processor 202, and/or the like, or a combination thereof, to generate at least one entry in a transfers table, the at least one entry representing the preferred one or more transfers. Each entry may comprise or be associated with a transfer status, indicating whether each user profile has accepted and/or declined the transfer, whether such responses are outstanding, and/or whether the transfer has been completed. The transfer status(es) in such entries may be updated as transfer initiation response data is received.

At operation 914, the transfer processing apparatus includes means, such as the transfer management circuitry 204, user management circuitry 205, communications circuitry 206, input/output circuitry 203, processor 202, and/or the like, or a combination thereof, to provide one or more transfer request notice for at least the first user profile identifier and at least one other user profile identifier associated with the preferred one or more transfers. For example, the transfer processing apparatus 200 may transmit such a transfer request notice(s) to a client device for each user profile. The transfer request notice may be configured to cause rendering of a specially configured user interface that enables the user corresponding to the user profile to input transfer initiation response data (e.g., via one or more user interactions via the user interface). For example, the user may utilize the interface to accept or decline the preferred transfers. It should be appreciated that a particular user may utilize a client device to initiate an authenticated session associated with a particular user profile, thus causing the client device to render one or more user interface(s) for reviewing the transfers initiated and/or otherwise provided associated with the user profile via corresponding transfer request notice(s). The user may then utilize such client devices, or other client devices subsequently accessed by the user, to provide request initiation response data for one or more of said outstanding and/or otherwise generated transfers that has not yet been actioned upon (e.g., not accepted nor declined).

Data, including transfer(s), available data object(s) for other user profile(s), and/or the like, may be provided to a client device and/or displayed via any of a myriad of computing process(es) and/or mechanism(s). For example, in some embodiments, data is transmitted to the client device for rendering via a user-facing application associated with the transfer processing apparatus 200 that is executing on the client device corresponding to the particular user profile. Alternatively or additionally, in some embodiments, one or more third-party messages are transmitted including such data (e.g., the generated preferred transfers) for rendering via the client device utilizing one or more third-party services, applications, and/or the like executing on the client device. For example, in some embodiments, the transfer processing apparatus 200 provides one or more email communications (or other third-party communications) to an email address (or other third-party account identifier) that enables the user to access such communications via an email application (or other third-party application corresponding to a third-party service) executing on the user's client device or client device(s). In this regard, it should be appreciated that such data may be provided via certain mechanisms to facilitate real-time results processing (e.g., in-app browsing) and via other mechanisms to facilitate scheduled processing and/or review of the provided results (e.g., via notifications sent to the user, third-party messages, and/or the like). In some embodiments, such transfers may be provided and/or otherwise represented via augmented reality interface(s) and/or virtual reality interface(s). In this regard, such interfaces may enable a user to view, interact with, engage with, and/or otherwise view particular aspects of the transfer and/or transferable data objects associated therewith. For example, in some embodiments, the virtual reality interface and/or augmented reality interface may depict a rendered representation of the transferable data object to be received upon completion of a particular preferred transfer provided to the user profile. Notice of preferred transfers may be provided in real-time, at determined time intervals (e.g., hourly, daily, weekly, and/or the like).

At operation 916, the transfer processing apparatus includes means, such as the transfer management circuitry 204, user management circuitry 205, communications circuitry 206, input/output circuitry 203, processor 202, and/or the like, or a combination thereof, to receive transfer initiation response data associated with the first user profile identifier, the at least one other user profile identifier associated with the preferred transfers, and/or a combination thereof. In some embodiments, the transfer processing apparatus 200 receives transfer initiation response data corresponding to one or more user profiles that embodies declining data object(s), for example indicating the user profile(s) have declined the transfer. Alternatively or additionally, in some embodiments, the transfer processing apparatus 200 receives transfer initiation response data corresponding to some or all user profiles that embodies transfer acceptance data object(s), for example indicating the user profile(s) have accepted the transfer. The transfer initiation response data may be received from each client device associated with a user profile corresponding to the transfer, for example in response to user interaction with one or more interface elements rendered via each of the client devices for indicating acceptance or declination of the transfer. In some embodiments, the transfer processing apparatus 200 updates the entries of the transfers table that correspond to the one or more preferred transfer(s) to reflect the statuses represented by the received transfer initiation response data.

At operation 918, the transfer processing apparatus includes means, such as the transfer management circuitry 204, user management circuitry 205, communications circuitry 206, input/output circuitry 203, processor 202, and/or the like, or a combination thereof, to process the transfer initiation response data. For example, in some embodiments, the transfer processing apparatus 200 determines whether transfer initiation response data indicates all user profiles have accepted the transfer. In such circumstances, the transfer processing apparatus 200 may proceed with finalizing the transfer, notifying all user profiles that the transfer has been accepted, and initiating completion of the transfer. For example, in some embodiments the transfer processing apparatus 200 automatically transfers the transferable data objects associated with the accepted transfer in the object repository from association with the sender user profile to association with the recipient user profile. Additionally or alternatively, the transfer processing apparatus 200 may adjust one or more accounts (e.g., resource wallet accounts) based on a deficit between the object resource values for such transferable data objects between sender and recipient user profiles. In yet some other embodiments, the transfer processing apparatus 200 provides transfer acceptance notices to each user profile that instructs the user with steps for completing the transfer.

Alternatively or additionally, in some embodiments, the transfer processing apparatus 200 determines received transfer initiation data includes a declining data object associated with one or more user profiles. In some embodiments, in such circumstances, the transfer processing apparatus 200 generates and/or provides a transfer declination notice to each user profile associated with the transfer, which indicates that at least one user profile has declined the transfer. Alternatively or additionally, in some embodiments, the transfer processing apparatus 200 attempts to replace all transfer(s) including the user profile associated with the declining data object with alternative transfer(s) including an alternative user profile. For example, in circumstances where two users profiles are associated with at least one matching preference association(s) and at least one available transferable data object utilized in the declined transfer, the transfer processing apparatus may replace the transfer to and from the declining user profile (e.g., any transfer where the declining user profile is a sender user profile and/or recipient user profile) with a transfer associated with the alternative user profile. In this regard, the transfer processing apparatus 200 may keep complex transfers (e.g., multi-way transfers involving a plurality of user profiles) going even in circumstances where only some of the user profiles associated with such transfers decline. Upon updating a transfer to include additional and/or alternative user profiles, the transfer processing apparatus 200 may provide updated transfer request notice(s) to all involved user profiles and/or only transfer request notices for the user profiles associated with the alternative transfers with the alternative user profiles. It should be appreciated that, alternative user profiles may be identified to replace a user profile that declined a particular transfer (or sub-transfer) in the contexts of two-way and multi-way transfers.

FIG. 10 illustrates a flowchart depicting example operations of another computer-implemented process for generating and/or facilitating preferred transfer(s) in accordance with at least some example embodiments of the present disclosure. Specifically, FIG. 10 depicts an example process 1000 for generating a multi-way by incrementally expanding a number of transfers between user profiles to be performed.

The process 1000 begins at operation 1002. The operation 1002 may begin after one or more operations of the process 900, for example after operation 906 as described with respect to FIG. 9. Additionally or alternatively, in some such circumstances, upon completion of the process 900 the process 1000 may return to the operations of process 900. In other embodiments, the process 1000 terminates upon successful completion of the operation 1006.

At operation 1002, the transfer processing apparatus includes means, such as the transfer management circuitry 204, user management circuitry 205, communications circuitry 206, input/output circuitry 203, processor 202, and/or the like, or a combination thereof, to increment a number of transfers to identify. In this regard, the transfer processing apparatus 200 may increase the complexity of the transfer to be identified by a particular value. For example, in some embodiments, the transfer processing apparatus 200 attempts to expand transfers by adding one additional transfer at a time (e.g., associated with one additional user profile). It should be appreciated that the transfer processing apparatus 200 may track the number of transfers as it attempts to identify a transfer that sufficiently satisfy a preference association for each user associated with the transfer.

At operation 1004, the transfer processing apparatus includes means, such as the transfer management circuitry 204, user management circuitry 205, communications circuitry 206, input/output circuitry 203, processor 202, and/or the like, or a combination thereof, to attempt to identify the plurality of transfers comprising the number of transfers, where the plurality of transfers satisfies the applicable preference associations corresponding to each user profile associated with the transfer. In this regard, the transfer processing apparatus may identify whether a transfer may be successfully completed based on the incremented number of transfers. For example, in circumstances where the number of transfers was incremented by one, the transfer processing apparatus 200 may determine whether an additional transfer to a particular user profile (e.g., an additional user profile not currently involved with the transfer) enables the transfer to satisfy a preference association for all user profiles associated with the transfer.

At operation 1006, the transfer processing apparatus includes means, such as the transfer management circuitry 204, user management circuitry 205, communications circuitry 206, input/output circuitry 203, processor 202, and/or the like, or a combination thereof, to determine whether one or more satisfying transfers comprising the incremented number of transfers has been identified. In circumstances where a satisfying transfer has not been identified, the process returns to operation 1002 and further increments the number of transfers to identify. In this regard, the transfer processing apparatus 200 may continue to increment the number of transfers until a satisfying transfer is identified, or in some circumstances until a threshold maximum number of transfers is reached. In circumstances where one or more satisfying transfers have been identified, the flow of process 1000 ends and/or continues to a subsequent operation.

In some embodiments, minimizing the number of transfers required to transfer satisfying transferable data objects between user profiles improves the likelihood of such transfers being accepted by all applicable user profiles. In this regard, the generated preferred transfers reduce the likelihood of wasted computing resources resulting from generated transfers not probable to be accepted by the associated user profiles. In some other embodiments, the transfer processing apparatus 200 is configured to attempt an increased number of transfers between user profiles, and decrements the number of transfers upon each unsuccessful attempt to generate one or more linked transfers that satisfy preference associations for all applicable user profiles. In some such embodiments, the transfer processing apparatus 200 may generate transfers in an attempt to minimize the total number of transfers performed, for example, and/or to encourage transferring between various groups and/or subgroups of registered user profiles. For example, in some embodiments, one or more user profiles may be grouped together via one or more identifiers (e.g., as friends, liking the same interests, or otherwise in a particular community associated with a group identifier), and in some such embodiments the transfer processing apparatus 200 may attempt to maximize the number of user profiles involved with each transfer. Additionally or alternatively, some such embodiments may reduce the number of smaller transfers (e.g., two-way transfers), and thereby reduce the amount of computing resources traditionally utilized to generate such transfer(s), provide notification(s) and/or other data associated with such transfer(s), store records of such transfer(s), and/or the like.

FIG. 11 illustrates a flowchart depicting example operations of another computer-implemented process for generating and/or facilitating preferred transfer(s) in accordance with at least some example embodiments of the present disclosure. Specifically, FIG. 11 depicts an example process 1100 for selecting preferred transfer(s) based on automatically programmatically generated object resource value data.

The process 1100 begins at operation 1102. The operation 1102 may begin after one or more operations of the process 900, for example after operation 910 as described with respect to FIG. 9. Additionally or alternatively, in some such circumstances, upon completion of the process 900 the process 1100 may return to the operations of process 900. In other embodiments, the process 1100 terminates upon successful completion of the operation 1104.

At operation 1102, the transfer processing apparatus includes means, such as the transfer management circuitry 204, user management circuitry 205, communications circuitry 206, input/output circuitry 203, processor 202, and/or the like, or a combination thereof, to, for each transfer of the at least one transfer, automatically programmatically generate object resource value data for each transferable data object associated with the transfer. The object resource value data may be programmatically generated utilizing one or more object resource value data generation algorithm(s) and/or model(s), for example as described herein with respect to FIG. 8. In this regard, the transfer processing apparatus 200 may automatically generate appropriate object resource value data to improve the likelihood of the transfer completing successfully (e.g., being accepted by all user profiles associated with the transfers).

At operation 1104, the transfer processing apparatus includes means, such as the transfer management circuitry 204, user management circuitry 205, communications circuitry 206, input/output circuitry 203, processor 202, and/or the like, or a combination thereof, to select the preferred one or more transfer that minimize a resource differential between the object resource value data for each transferable data object associated with the at least one transfer. For example, in some embodiments, the transfer processing apparatus 200 may identify various transfers that each satisfy particular preference association(s) for one or more user profile(s). The transfer processing apparatus 200 may determine a resource differential between the transferable data objects associated with each of such transfers (e.g., by taking the difference between the object resource value data for a first transferable data object associated with a sender user profile for the transfer and the object resource value data for a second transferable data object associated with a recipient user profile for the transfer and/or a sender user profile for a second, linked transfer). The transfer processing apparatus 200 may subsequently determine which transfers are associated with the lowest (for example) resource differential, and select such transfers as the preferred transfers. In this regard, the transfers are generated in a manner that supports transfers of equal resource value to improve the likelihood that each user profile accepts the transfer, for example whereas unbalanced transfers (e.g., having a high resource differential) may be more likely to be declined as unfair or one-sided.

CONCLUSION

Any feature, step, element, embodiment, or aspect of the invention can be used in combination with any other unless specifically indicated otherwise. Although the present disclosure has been described in some detail by way of illustration and example for purposes of clarity and understanding, it will be apparent that certain changes and modifications may be practiced within the scope of the appended claims.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least a processor, and memory associated with the processor having computer coded instructions therein, with the computer coded instructions configured to, when executed by the processor, cause the apparatus to:
   store, in the memory, a plurality of user profiles, wherein each user profile comprises a listing of transferable digital data objects and wherein at least a portion of the listing of transferable digital data objects are identified as available data objects within each user profile;
   receive, from a first user device, first preference association data for a first user profile of the plurality of user profiles, wherein the first preference association data identifies a first transferable digital data object defining a particular type of transferable digital data object or grouping of transferable digital data objects for receipt by the first user profile via at least one transfer performed via the apparatus from at least one second user profile of the plurality of user profiles;
   identify at least one second transferable digital data object in at least a second user profile that satisfies the first preference association data for the first user profile,
   wherein to identify the at least one second transferable digital data object the apparatus is caused to:
      automatically generate first object resource value data associated with the first transferable digital data object and second object resource value data associated with the second transferable digital data object, wherein at least one of the first object resource value data or the second object resource value data is automatically generated based at least in part on data received from at least one external data source via an application programming interface (API);
      determine whether the first object resource value data and the second object resource value data satisfy value matching criteria based at least in part on the first preference association data and second preference association data stored as part of a second user profile associated with the second transferable digital data object;
      in a circumstance where the first object resource value data and the second object resource value data does not satisfy the value matching criteria, identify at least one other transferable object associated with at least one other user profile, wherein the identified at least one other transferable object together with the first transferable digital data object and the second transferable digital data object satisfy the value matching criteria;
   generate one or more transfers comprising the at least one second transferable digital data object in the second user profile and the at least one first transferable digital data object in the first user profile that satisfy value matching criteria of the at least one second transferable digital data object in the second user profile and the at least one first transferable digital data object in the first user profile;
   automatically select a preferred transfer of the one or more transfers via the apparatus;
   automatically provide, via the apparatus, one or more transfer request notices for at least the first user profile and at least the second user profile associated with the preferred at least one transfer;
   receive transfer initiation response data associated with the first user profile, at least the second user profile, or a combination thereof; and
   process the transfer initiation response data by at least automatically initiating the at least one transfer via the apparatus.

2. The apparatus according to claim 1, wherein to identify the first transferable digital data object associated with the first user profile, the apparatus is configured to iterate through a first transferable digital data object list associated with the first user profile, and wherein, for each transferable digital data object in the first transferable digital data object list, the apparatus initiates generation of a transfer that includes the transferable digital data object to satisfy the second preference association of the second user profile associated with the transfer, the second user profile indicated as recipient user profile for the transfer.

3. The apparatus according to claim 1, wherein to generate the one or more transfers, the apparatus is configured to:
   identify an available transferable digital data object that satisfies the first preference association, wherein the available transferable digital data object is associated with the second user profile, wherein transfer of the at least one available transferable digital data object associated with the first user profile satisfies a second preference association of the second user profile; and
   generate the transfer of the at least one available transferable digital data object associated with the first user and the second user profile.

4. The apparatus according to claim 1, wherein to generate the one or more transfers, the apparatus is configured to:
   determine that no transfer of an available transferable digital data object satisfies the first preference association by initiating identification of an available transferable digital data object that satisfies the first preference association; and
   automatically generate a plurality of transfers that embody a multi-way transfer between the first user profile and a plurality of other user profiles, wherein the plurality of transfers satisfy the first preference association and an additional preference association for each other user profile of the plurality of other user profiles.

5. The apparatus according to claim 4, wherein to identify the plurality of transfers associated with the first user profile and the plurality of other user profile, the apparatus is configured to:
   increment a number of transfers to identify;
   initiate generation of the plurality of transfers comprising the number of transfers, wherein the number of transfers is further incremented in a circumstance where the plurality of transfers comprising the number of transfers is determined not to satisfy the first preference association.

6. The apparatus according to claim 1, wherein to select the preferred at least one transfer of the one or more transfers, the apparatus is configured to:
generate, utilizing a transfer optimization model, transfer preference ranking data for each transfer of the at least one transfer;
select the preferred transfer of the one or more transfers based at least in part on the transfer preference ranking data.

7. The apparatus according to claim 1, further configured to generate at least one entry in a transfers table, the at least one entry representing the preferred at least one transfer, wherein to generate the at least one entry in the transfers table, the apparatus is configured to:
generate an entry in the transfer table for each preferred transfer of the preferred at least one transfer of the one or more transfers, wherein each entry for the preferred at least one transfer is linked with at least one shared transfer identifier.

8. The apparatus according to claim 1, wherein to process the transfer initiation response data, the apparatus is configured to:
determine the transfer initiation response data comprises an acceptance data object associated with each of the preferred at least one transfer of the one or more transfers; and
update the at least one entry in the transfers table to indicate acceptance of the preferred at least one transfer of the one or more transfers.

9. The apparatus according to claim 1, further configured to generate at least one entry in a transfers table, the at least one entry representing the preferred at least one transfer, wherein to process the transfer initiation response data, the apparatus is configured to:
determine the transfer initiation response data comprises at least one declining data object associated with a particular preferred transfer of the preferred at least one transfer of the one or more transfers, the particular preferred transfer associated with a first transferable digital data object and a second transferable digital data object;
identify one or more alternative preferred transfers for the first transferable digital data object and the second transferable digital data object;
generate at least one updated entry in the transfers table, the at least one entry representing the one or more alternative preferred transfers; and
provide one or more additional transfer request notice for each user profile associated with one or more alternative preferred transfers.

10. The apparatus according to claim 1, further configured to generate at least one entry in a transfers table, the at least one entry representing the preferred at least one transfer, wherein to process the transfer initiation response data, the apparatus is configured to:
determine the transfer initiation response data comprises at least one declining data object associated with a particular preferred transfer of the preferred at least one transfer of the one or more transfers;
identify one or more alternative preferred transfers to replace the particular preferred transfer, wherein the one or more alternative preferred transfers satisfy a second preference association for each user profile associated with the one or more alternative preferred transfers;
generate at least one updated entry in the transfers table, the at least one entry representing the one or more alternative preferred transfers; and
provide one or more alternative transfer request notice for each user profile associated with one or more alternative preferred transfers.

11. The apparatus according to claim 1, wherein to select the preferred at least one transfer of the one or more transfers of the at least one transfer, the apparatus is configured to:
for each particular transfer of the at least one transfer, automatically programmatically generate object resource value data for each transferable digital data object associated with the particular transfer, the object resource value data generated based at least in part on the at least one external data source; and
select the preferred at least one transfer of the one or more transfers that minimize a resource differential between the object resource value data for each transferable digital data object associated with the particular transfer.

12. The apparatus according to claim 11, wherein to automatically programmatically generate object resource value data for each transferable digital data object associated with the transfer, the apparatus is configured to:
identify API-generated resource value data for the transferable object utilizing an object resource value generating API based at least in part on transferable digital data object detail data corresponding to the transferable digital data object;
determine the transferable digital data object is identified via the object resource value generating API;
parse the API-generated resource value data to identify the object resource value data for the transferable digital data object; and
associate the object resource value data represented by the API-generated resource value data with the transferable digital data object.

13. The apparatus according to claim 11, wherein to automatically programmatically generate object resource value data for each transferable digital data object associated with the particular transfer, the apparatus is configured to:
initiate identification of API-generated resource value data for the transferable object utilizing an object resource value generating API based at least in part on transferable digital data object detail data corresponding to the transferable digital data object;
determine the transferable digital data object is not identified via the object resource value generating API;
access a data object blockchain to validate user-inputted object resource value data corresponding to the transferable digital data object;
determine validity of the user-inputted object resource value data based on blockchain data identified from the data object blockchain; and
associate the object resource value data generated based on the validity of the user-inputted object resource value data and the blockchain data.

14. A computer-implemented method comprising:
storing, via at least one computing system, a plurality of user profiles, wherein each user profile comprises a listing of transferable digital data objects and wherein at least a portion of the listing of transferable digital data objects are identified as available data objects within each user profile;

receiving, via the at least one computing system and from a first user device, first preference association data for a first user profile of the plurality of user profiles, wherein the first preference association indicates a particular type of transferable digital data object or grouping of transferable digital data objects indicated to be received by the first user profile via at least one transfer performed via the at least one computing system from at least one second user profile of the plurality of user profiles;

identifying, via the at least one computing system, at least one second transferable digital data object in at least a second user profile that satisfies the first preference association data for the first user profile, wherein identifying the at least one second transferrable-transferable digital data object comprises:

automatically generating, via the at least one computing system, first object resource value data associated with the first transferable digital data object and second object resource value data, wherein at least one of the first object resource value data or the second object resource value data is generated based at least in part on data received from at least one external data source via an application programming interface (API);

determining, via the at least one computing system, whether the first object resource value data and the second object resource value data satisfy value matching criteria based at least in part on the first preference association data and second preference association data stored as part of a second user profile associated with the second transferable digital data object;

in a circumstance where the first object resource value data and the second object resource value data does not satisfy the value matching criteria, identifying, via the at least one computing system, at least one other transferable object associated with at least one other user profile, wherein the identified at least one other transferable object together with the first transferable digital data object and the second transferable digital data object satisfy the value matching criteria;

generating, via the at least one computing system, one or more transfers comprising the at least one second transferable digital data object in the second user profile and the at least one first transferable digital data object in the first user profile that satisfy value matching criteria of the at least one second transferable digital data object in the second user profile and the at least one first transferable digital data object in the first user profile;

automatically selecting a preferred transfer of the one or more transfers via the at least one computing system;

automatically providing, via the at least one computing system, one or more transfer request notices for at least the first user profile and at least the second user profile associated with the preferred at least one transfer;

receiving, via the at least one computing system, transfer initiation response data associated with the first user profile, at least the second user profile, or a combination thereof; and processing, via the at least one computing system, the transfer initiation response data by at least automatically initiating the at least one transfer via the at least one computing system.

15. The computer-implemented method according to claim 14, wherein generating the one or more transfers comprises:

determining that no transfer of an available transferable digital data object satisfies the first preference association by initiating identification of an available transferable digital data object that satisfies the first preference association; and automatically generating a plurality of transfers that embody a multi-way transfer between the first user profile and a plurality of other user profiles, wherein the plurality of transfers satisfy the first preference association and an additional preference association for each other user profile of the plurality of other user profiles.

16. The computer-implemented method according to claim 15, wherein identifying the plurality of transfers associated with the first user profile identifier and the plurality of other user profile identifiers comprises:

incrementing a number of transfers to identify;

initiating identification of the plurality of transfers comprising the number of transfers, wherein the number of transfers is further incremented in a circumstance where the plurality of transfers comprising the number of transfers is determined not to satisfy the first preference association.

17. The computer-implemented method according to claim 14, further comprising generating at least one entry in a transfers table, the at least one entry representing the preferred at least one transfer, wherein processing the transfer initiation response data comprises:

determining the transfer initiation response data comprises at least one declining data object associated with a particular preferred transfer of the preferred at least one transfer of the one or more transfers;

identifying one or more alternative preferred transfers to replace the particular preferred transfer, wherein the one or more alternative preferred transfers satisfy a second preference association for each user profile identifier associated with the one or more alternative preferred transfers;

generating at least one updated entry in the transfers table, the at least one entry representing the one or more alternative preferred transfers; and providing one or more alternative transfer request notice for each user profile identifier associated with one or more alternative preferred transfers.

18. The computer-implemented method according to claim 14, wherein selecting the preferred at least one transfer of the one or more transfers of the at least one transfer comprising:

for each particular transfer of the at least one transfer, automatically programmatically generating object resource value data for each transferable digital data object associated with the particular transfer, the object resource value data generated based at least in part on the at least one external data source; and selecting the preferred at least one transfer of the one or more transfers that minimize a resource differential between the object resource value data for each transferable digital data object associated with the particular transfer.

19. A computer program product comprising at least at least one non-transitory computer-readable storage medium having computer program code stored thereon that, in execution with at least one processor, configures the computer program product for:

storing a plurality of user profiles, wherein each user profile comprises a listing of transferable digital data objects and wherein at least a portion of the listing of transferable digital data objects are identified as available data objects within each user profile;

receiving, from a first user device, first preference association data for a first user profile of the plurality of user profiles, wherein the first preference association indicates a particular type of transferable digital data object or grouping of transferable digital data objects indicated to be received by the first user profile via at least one transfer performed via the at least one processor from at least one second user profile of the plurality of user profiles;

identifying at least one second transferable digital data object in at least a second user profile that satisfies the first preference association data for the first user profile, wherein identifying the at least one second transferable digital data object comprises:

automatically generating first object resource value data associated with the first transferable digital data object and second object resource value data associated with the second transferable digital data object, wherein at least one of the first object resource value data or the second object resource value data is generated based at least in part on data received from at least one external data source via an application programming interface (API);

determining whether the first object resource value data and the second object resource value data satisfy value matching criteria based at least in part on the first preference association data and second preference association data stored as part of a second user profile associated with the second transferable digital data object;

in a circumstance where the first object resource value data and the second object resource value data does not satisfy the value matching criteria, identifying at least one other transferable object associated with at least one other user profile, wherein the identified at least one other transferable object together with the first transferable digital data object and the second transferable digital data object satisfy the value matching criteria;

generating one or more transfers comprising the at least one second transferable digital data object in the second user profile and the at least one first transferable digital data object in the first user profile that satisfy value matching criteria of the at least one second transferable digital data object in the second user profile and the at least one first transferable digital data object in the first user profile;

automatically selecting a preferred at least one transfer of the one or more transfers via the at least one processor;

automatically providing, via the at least one processor, one or more transfer request notices for at least the first user profile and at least the second user profile associated with the preferred at least one transfer;

receiving transfer initiation response data associated with the first user profile, at least the second user profile, or a combination thereof; and processing the transfer initiation response data by at least automatically initiating the at least one transfer via the at least one processor.

20. The apparatus according to claim 1, wherein to automatically select the preferred transfer of the one or more transfers, the apparatus is configured to:

automatically generate the preferred transfer from the one or more transfers using a machine learning model trained to generate transfer preference ranking data for each transfer of the one or more transfers based at least in part on historical data associated with the first user profile and select from the one or more transfers based at least in part on the transfer preference ranking data.

* * * * *

UNITED STATES PATENT AND TRADEMARK OFFICE
CERTIFICATE OF CORRECTION

| | |
|---|---|
| PATENT NO. | : 12,026,149 B2 |
| APPLICATION NO. | : 17/220685 |
| DATED | : July 2, 2024 |
| INVENTOR(S) | : Prajapati et al. |

Page 1 of 1

It is certified that error appears in the above-identified patent and that said Letters Patent is hereby corrected as shown below:

In the Claims

<u>Column 65,</u>
Lines 16 and 17, Claim 14, "transferrable-transferable" should read --transferable--.

Signed and Sealed this
Sixth Day of May, 2025

Coke Morgan Stewart
*Acting Director of the United States Patent and Trademark Office*